(12) United States Patent
Kulkova et al.

(10) Patent No.: US 12,544,229 B2
(45) Date of Patent: Feb. 10, 2026

(54) CONTINUOUS FIBER-REINFORCED BUILD MATERIAL FOR ADDITIVE MANUFACTURING

(71) Applicant: AMBROCIO OY, Turku (FI)

(72) Inventors: Yulia Kulkova, Turku (FI); Artem Plyusnin, Turku (FI)

(73) Assignee: AMBROCIO OY, Turku (FI)

( * ) Notice: Subject to any disclaimer, the term of this patent is extended or adjusted under 35 U.S.C. 154(b) by 1040 days.

(21) Appl. No.: 17/626,511

(22) PCT Filed: Jul. 14, 2020

(86) PCT No.: PCT/FI2020/050496
§ 371 (c)(1),
(2) Date: Jan. 12, 2022

(87) PCT Pub. No.: WO2021/009414
PCT Pub. Date: Jan. 21, 2021

(65) Prior Publication Data
US 2022/0259781 A1    Aug. 18, 2022

(30) Foreign Application Priority Data

Jul. 15, 2019 (FI) ...................................... 20195638

(51) Int. Cl.
*A61F 2/28* (2006.01)
*A61B 17/80* (2006.01)
(Continued)

(52) U.S. Cl.
CPC ................ *A61F 2/28* (2013.01); *A61B 17/80* (2013.01); *A61B 17/8071* (2013.01);
(Continued)

(58) Field of Classification Search
None
See application file for complete search history.

(56) References Cited

U.S. PATENT DOCUMENTS

| 4,664,961 A | 5/1987 | Vees et al. |
| 4,917,699 A | 4/1990 | Chervitz |

(Continued)

FOREIGN PATENT DOCUMENTS

| EP | 3470097 A1 | 4/2019 |
| WO | 9609014 A1 | 3/1996 |

(Continued)

OTHER PUBLICATIONS

International Search Report issued by the European Patent Office acting as the International Searching Authority in relation to International Application No. PCT/FI2020/050496 dated Feb. 8, 2021 (7 pages).

(Continued)

*Primary Examiner* — Rebecca S Preston
(74) *Attorney, Agent, or Firm* — Carter, DeLuca & Farrell LLP

(57) ABSTRACT

A continuous fiber-reinforced build material for additive manufacturing (AM) of fiber-reinforced composite (FRC) structures, a machine for the preparation of the build material, and use of the build material for manufacturing of three-dimensional (3D) FRC end-product devices, such as medical devices for management of musculoskeletal and dental disorders.

20 Claims, 10 Drawing Sheets

(51) Int. Cl.

| | | |
|---|---|---|
| *A61F 2/30* | (2006.01) | |
| *A61L 27/42* | (2006.01) | |
| *A61L 27/44* | (2006.01) | |
| *A61L 31/12* | (2006.01) | |
| *B33Y 40/10* | (2020.01) | |
| *B33Y 70/10* | (2020.01) | |
| *B33Y 80/00* | (2015.01) | |
| *C08J 5/24* | (2006.01) | |
| *D04C 1/06* | (2006.01) | |
| *A61B 17/84* | (2006.01) | |
| *A61L 27/54* | (2006.01) | |
| *A61L 31/16* | (2006.01) | |

(52) U.S. Cl.
CPC .......... *A61F 2/2846* (2013.01); *A61F 2/2875* (2013.01); *A61F 2/30965* (2013.01); *A61L 27/42* (2013.01); *A61L 27/44* (2013.01); *A61L 31/121* (2013.01); *A61L 31/125* (2013.01); *B33Y 40/10* (2020.01); *B33Y 70/10* (2020.01); *B33Y 80/00* (2014.12); *C08J 5/243* (2021.05); *C08J 5/244* (2021.05); *C08J 5/245* (2021.05); *C08J 5/246* (2021.05); *D04C 1/06* (2013.01); *A61B 17/842* (2013.01); *A61L 27/54* (2013.01); *A61L 31/16* (2013.01); *D10B 2505/02* (2013.01)

(56) References Cited

U.S. PATENT DOCUMENTS

| | | |
|---|---|---|
| 5,997,970 A | 12/1999 | You |
| 7,419,714 B1 | 9/2008 | Magerl et al. |
| 10,287,719 B2 | 5/2019 | Endres et al. |
| 2002/0130112 A1 | 9/2002 | Manasas et al. |
| 2005/0081913 A1 | 4/2005 | Ebbesen et al. |
| 2007/0141111 A1 | 6/2007 | Suokas et al. |
| 2011/0319978 A1* | 12/2011 | Schaffer ................ A61L 31/022 623/1.15 |
| 2012/0253464 A1 | 10/2012 | Hwang et al. |
| 2015/0202430 A1 | 7/2015 | Finley et al. |
| 2016/0113695 A1 | 4/2016 | Globerman et al. |
| 2017/0273775 A1 | 9/2017 | Rocco et al. |
| 2019/0015142 A1* | 1/2019 | Mitchell ............... A61B 17/826 |
| 2019/0127539 A1 | 5/2019 | Dyksterhouse |

FOREIGN PATENT DOCUMENTS

| | | |
|---|---|---|
| WO | 2019037657 A1 | 2/2019 |
| WO | 2019093898 A2 | 5/2019 |

OTHER PUBLICATIONS

Written Opinion of the International Searching Authority issued by the European Patent Office acting as the International Searching Authority in relation to International Application No. PCT/FI2020/050496 dated Feb. 8, 2021 (16 pages).

Finnish Search Report issued by the Finnish Patent and Registration Office in relation to Finnish Application No. 20195638 dated Nov. 14, 2019 (2 pages).

International Preliminary Report on Patentability issued by the European Patent Office acting as the International Prelimianry Examining Authority in relation to International Application No. PCT/FI2020/050496 dated Oct. 7, 2021 (11 pages).

\* cited by examiner

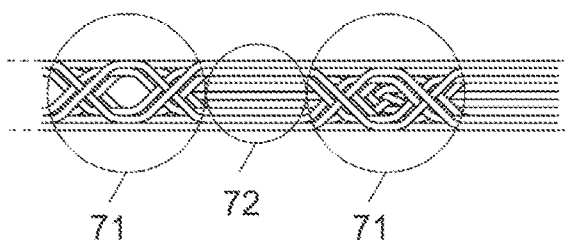
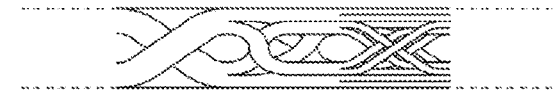
71　72　71
Fig. 1
Fig. 2
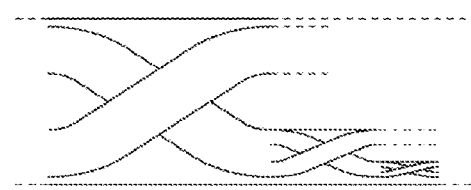
Fig. 3
Fig. 4A
Fig. 4B
Fig. 4C
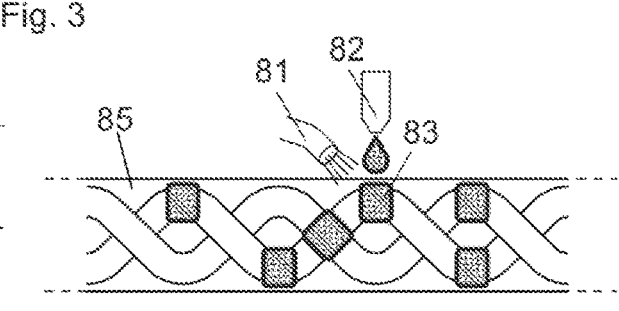
Fig. 5
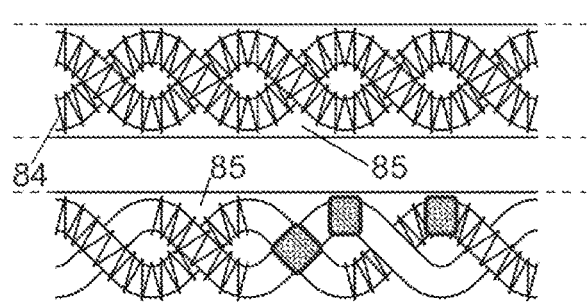
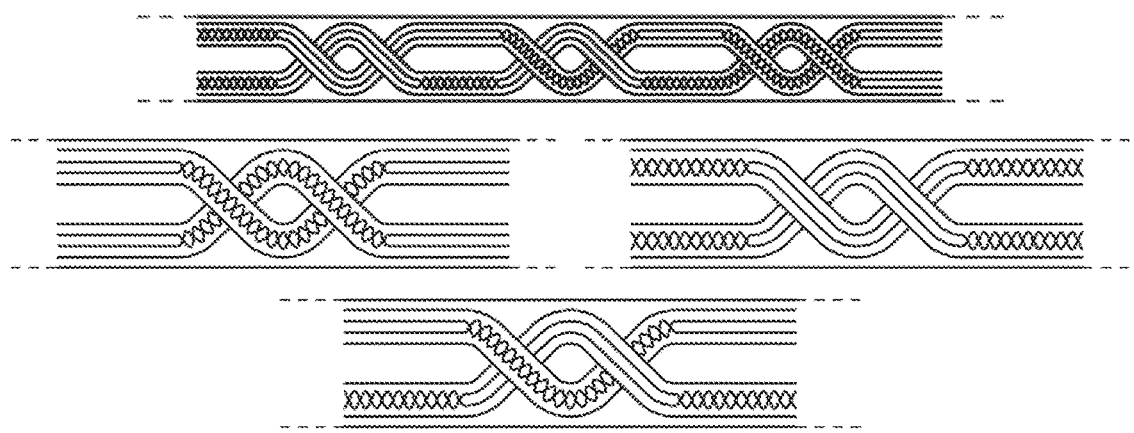
Fig. 6

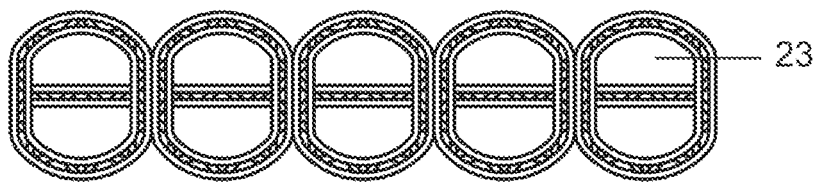
Fig. 30A
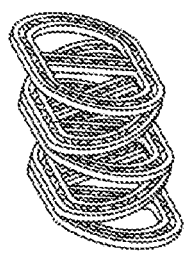 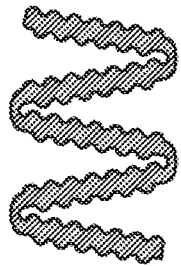  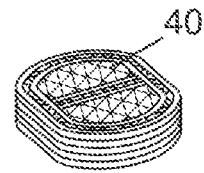
Fig. 30B  Fig. 30C  Fig. 30D  Fig. 30E
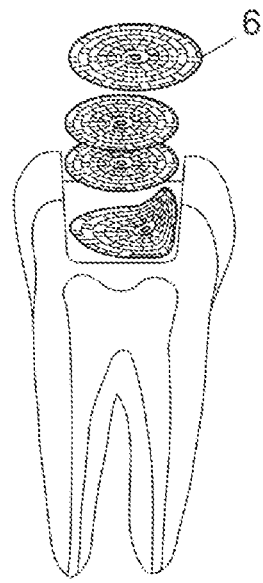 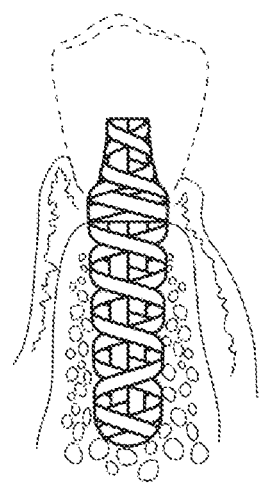
Fig. 31  Fig. 33
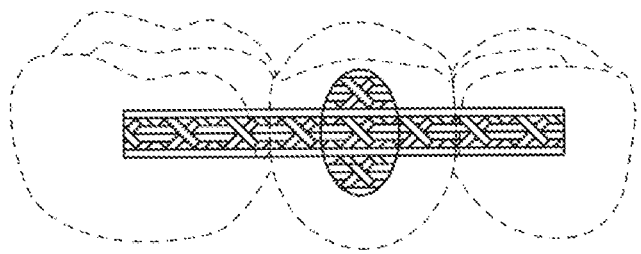
Fig. 32

CONTINUOUS FIBER-REINFORCED BUILD MATERIAL FOR ADDITIVE MANUFACTURING

CROSS-REFERENCE TO RELATED APPLICATIONS

This application is a national phase entry under 35 U.S.C. 371 of PCT International Application No. PCT/FI2020/050496 filed Jul. 14, 2020, which claims priority to Finnish Patent Application No. 20195638, filed Jul. 15, 2019, the disclosure of each of these applications is expressly incorporated herein by reference in their entirety.

TECHNICAL FIELD

The invention relates to a continuous fiber-reinforced build material for additive manufacturing (AM) of fiber-reinforced composite (FRC) structures, a machine for the preparation of the build material, and use of the build material for manufacturing of three-dimensional (3D) FRC end-product devices, such as medical devices for management of musculoskeletal and dental disorders.

BACKGROUND

Use of polymers is growing in all possible fields of industry. However, for load-bearing applications, pure polymeric parts are often not sufficiently strong. To improve the mechanical performance of polymeric parts, the conventional manufacturing approach assumes making composites by reinforcing pure polymers with particles or fibers of stronger materials. Polymer-based composites may acquire the highest mechanical properties when reinforced with continuous fibers, such as glass or carbon ones. In such composites, the polymer is called matrix phase, and the fibers or other reinforcing objects are called reinforcement phase of the composite.

The most widespread ways of fabrication of composite structures reinforced with continuous fibers have been cutting end-product two-dimensional (2D) parts from standard plane laminates or building of parts with more complex shapes in a manner resembling building of a cocoon by some insects. However, these methods are often related to wasting of significant amounts of material, are labor-intensive and in many cases are difficult to automatize.

In recent decades, advancement of so-called additive manufacturing (AM) technologies could partially improve the situation with fabrication of FRC structures.

For instance, tailored fiber placement (TFP) have been introduced in airspace and automotive industries. In this textile technique continuous fiber rovings are stitched to a base material, like a piece of cloth, according to some predefined pattern. This allows manufacturing of so called preforms—structures which have a shape close to the shape of the end-product device and in which fiber rovings can be placed in the most optimal way from the standpoint of distribution of stresses under load. The preform is further impregnated in polymer matrix in a mold or in a vacuum bag. TFP significantly reduces wasting of materials, however, it is still relatively time-consuming and mostly oriented on 2D shapes.

Attempts have also been made to fabricate composite structures by adaptation of the existing 3D printing polymer techniques considering the concrete type of build materials used in those techniques. For instance, in conventional stereolithography (SLA) or PolyJet printing light-curable liquid resin is used as a build material. To produce some structure, a 3D model of it is virtually cut into layers of equal finite thickness. Layers of liquid resin of equal thickness are then added into the working area of an SLA or PolyJet printer one-by-one, and a region repeating a cross-section of the 3D model in the corresponding layer is cured with a laser, thus forming a spatial structure. Small (nano- or microscale) particles or short chopped fibers can easily be added into the liquid resin for those techniques to obtain reinforced structures. However, such type of reinforcing allows only limited increase of mechanical properties. Laminates consisting of one or few layers of woven or non-woven fabric can also be obtained with standard SLA machines by placing of pieces of fabric into the resin during the printing process. However, applications for such structures are highly limited, and in fact, 3D printing of those do not present real advantages over traditional mass production of plane laminates and further rapid cutting of simple 2D parts from those.

There are also a few techniques dealing with continuous fiber placement and based on conventional fused deposition modeling (FDM). A build material used for manufacturing of 3D objects in FDM technique is called filament and represents a continuous, virtually endless, piece of thermoplastic material with a round cross-section. The 3D model of an object which is being built by FDM printer is virtually cut into layers as in other 3D-printing techniques. During the printing process, the filament is passing through an extruder which has a smaller diameter than the diameter of the filament and which is heated up to a temperature above the melting temperature of the filament's thermoplastic material. The melted thermoplastic coming out from the extruder is deposited into adjoining strips to fill in each layer of the object one-by-one. Those adjoining strips are still hot enough during some short period after they have passed through the extruder, and thus they stick to each other, and thus the object gets consolidated.

In the modifications of the original FDM technique dealing with fabrication of FRC structures, the filament may contain within itself a single continuous reinforcing fiber made of glass, carbon or other appropriate materials, or a bundle of such fibers. Sometimes the reinforcing fibers can be fed separately from pure-plastic filament and mixed with the plastic in the extruder or immediately after it, while the plastic is hot enough.

The FDM-like FRC techniques seems to be the most demanded 3D-printing techniques in the composite industry. For instance, a machine, very close to the original FDM printers, have been patented (EP 3 022 046 B1) and introduced on the market by Markforged Inc. It allows printing of structures cut into flat layers parallel to X-Y plane. A further advancement has been made by Marinella Levi et al., who suggested in WO 2017/085649 an FDM-like machine, sometimes referred to as a free-form 3D printer, in which fiber roving is impregnated in viscous liquid resin and can be placed in a more free shape in a manner of building a cocoon. Instead of self-hardening by cooling of deposited thermoplastic, this type of machines uses light curing of recently placed material. Machines utilizing these principles are built by the company Moi composites S.r.l.

Although the principle of FDM technique virtually allows deposition of the material according to any complex pattern, the reinforcing fibers are quite stiff, and this stiffness does not allow placing of the fibers, for instance, in loops with small radii. The inconsistent stiffness of the fiber and matrix materials may lead to delamination of recently deposited fibers from the polymer when the extruder significantly changes the direction of the deposition of the filament, and recently deposited polymer is not completely hardened yet. Therefore, in complex composite objects, some regions which have quasi 1-dimensional shape (1D; i.e., one of the dimensions of the shape is significantly greater than the others) are difficult to be filled in by conventional deposition of continuous linear filament so that those regions would be reinforced in all directions but the primary one. When subjected to a complex multiaxis load, for instance a load having torsion component, such quasi-1D regions may be easily twisted and, as a result, start delaminating. Having a build material which is structurally reinforced in all directions, such undesired consequences can be significantly reduced. In addition, the time of building such quasi-1D structures can be reduced. Thus, the real flexibility of FDM-like FRC techniques remains disputable. Moreover, separate strands of the reinforcing fiber rovings are not connected to each other by anything but limited adhesion between the fibers and polymer and between adjoining strips of polymer themselves.

Finally, the common problem of all 3D printing techniques remains the need for supporting structures when a complex-shaped object with non-planar base surface is built. Such structures are typically built from the same or a different material during normal 3D-printing process, thus increasing the amount of further wasted material.

In accordance with the aforementioned, there is a need for a new approach to fabrication of FRC structures, which will take the advantages of the existing technologies and reduce the drawbacks of those.

SUMMARY

An object of the present invention is to overcome at least some the above-mentioned disadvantages associated with complex 3D FRC structures and manufacturing processes thereof. This object is achieved by a multi-purpose complex structurally optimized fiber reinforced build material disclosed herein. The disclosed material can be used both in conventional molding and in AM approaches; both in automated and in manual fabrication. Due to its intrinsic spatially optimized reinforcement, such a material will reduce the need for supporting structures in automated AM processes. In addition, this feature will provide a great advantage for such a material in production of quasi-1D structures. One of the fields where such structures are widespread is medical FRC devices for the treatment of musculoskeletal and dental disorders (for instance, plates, rods, intramedullary nails etc.). Consequently, the present build material has a great potential in rapid manufacturing of patient-specific medical devices on demand. The present invention discloses in detail the principles according to which such a material can be made, a machine for manufacturing of the build material and examples of its use in composite medical devices.

It is envisaged that the present build material will fasten the process of rapid fabrication of patient-specific fiber-reinforced composite medical devices on demand, and in some embodiments will easily allow in situ shaping of those devices in the operation theater, which by the moment has not been possible for FRC devices.

The build material, some uses thereof, an end-product medical device prepared from the build material and a machine for the preparation of the build material provided herein are characterized by what is stated in the independent claims. The preferred embodiments of the invention are disclosed in the dependent claims.

Other objects, embodiments, details and advantages of the present invention will become apparent from the following figures and the detailed description.

BRIEF DESCRIPTION OF THE DRAWINGS

The accompanying drawings illustrate several embodiments of the disclosed subject matter, and together with the description, serve to explain principles of the disclosed invention.

FIG. 1 illustrates an example of a continuous build material with two different braided segments (71) and an intervening straight segment (72).

FIG. 2 shows an example of a build material with a non-uniform braided segment.

FIG. 3 shows an example of a build material with nested levels of braided structure.

FIG. 4A depicts an example of a 2D-braided structure of a build material.

FIG. 4B illustrates an example of a 3D-braided structure of a build material.

FIG. 4C shows an example of a build material comprising a combination of 2D- and 3D-braided structures.

FIG. 5 illustrates examples of a build material comprising a base material (85). The fiber rovings are bonded to the base material by gluing with adhesive material (83) or by stitching with stitching yarn (84). An injector (82) may be used for applying the adhesive material (83), while an EMR emitter (81) may be used for curing the adhesive material (83) if it is a curable adhesive.

FIG. 6 shows examples of a build material comprising two rovings having braided segments. Each roving in the build material, in turn, comprise two nested fiber rovings having braided segments and placed with different filling patterns.

FIG. 30 shows an example of a load bearing implant, such as a spinal cage or an osteotomy wedge. FIG. 30A shows a two-dimensional preform with apertures (23). In FIG. 30B the preform is folded into its final shape. FIG. 30C illustrates that layers of the continuous roving are mechanically anchored with each other. FIG. 30D shows a ready implant. FIG. 30E shows a ready implant with inserts (40) comprising, e.g., autograft, allograft, xenograft, synthetic bone substitute, scaffold for tissue regeneration and/or other active agents.

FIG. 31 shows an example of a dental device comprising one or more separate or interconnected disks (60) for filling large tooth defects.

FIG. 32 shows an example of a dental tape with an integrated stump structure (61).

FIG. 33 shows an example of a dental implant.

FIG. 36 depicts an example of a machine for manufacturing of a continuous build material.

DETAILED DESCRIPTION

Figure 7A:
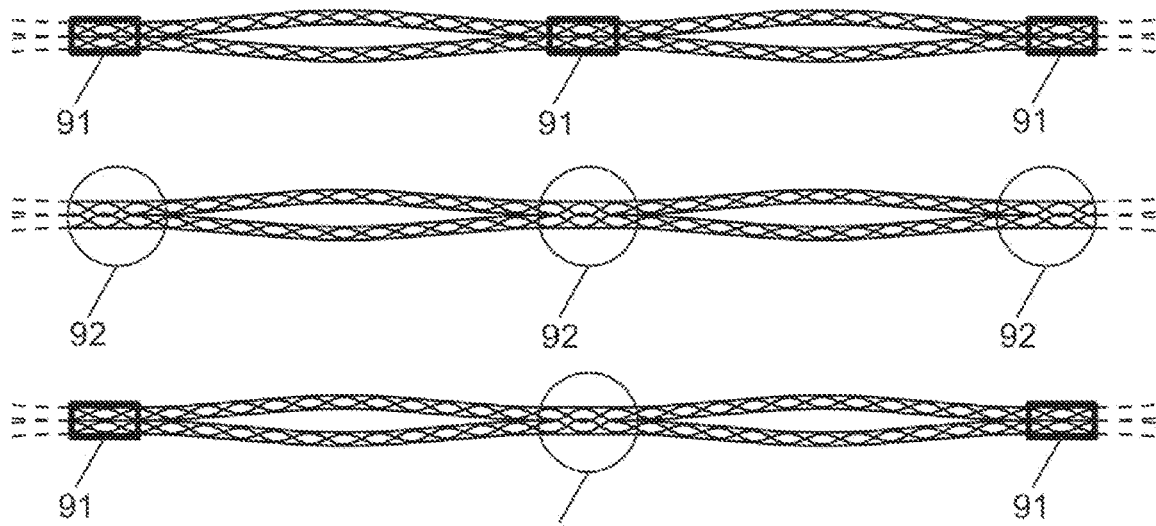
FIG. 7A depicts examples of an unfolding build material in strained state in which the rovings are joined by gluing with adhesive material (83) or by thereby creating glued joining points (91) or knitted joining points (92), respectively.
Figure 7B:
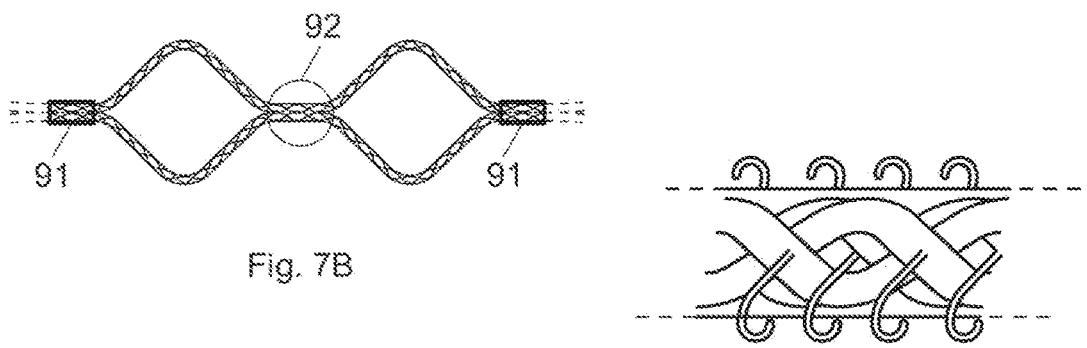
FIG. 7B illustrates an example of an unfolding build material in relaxed state or fixed in unfolded state after extrusion.
Figure 8A:
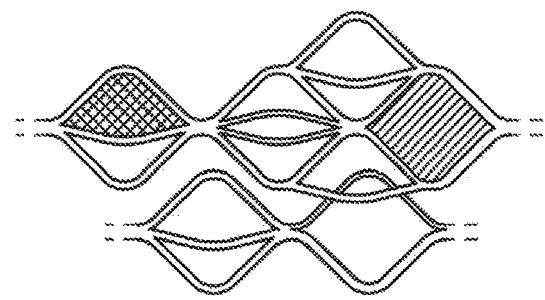
FIG. 8A shows examples of a plane unfolding build material.
Figure 8B:
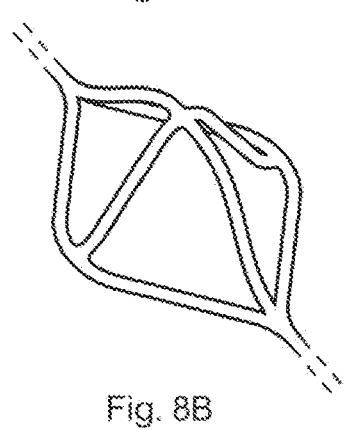
FIG. 8B shows an example of an unfolding build material in which the fiber rovings are placed three-dimensionally.

The present invention provides a continuous build material that may be used, for example, in medical industry, construction industry, marine industry, airspace industry, automotive industry or any other industry for manufacturing various end-product devices and preforms thereof. Accordingly, the build material can be used to manufacture a wide range of end-products and preforms thereof, such as medical devices, human-powered vehicles and equipment for sport, leisure or recreational purposes to name few non-limiting examples.

As used herein, the term "end-product device" refers to a ready-to-use FRC structure made by any appropriate technique, wherein the structure comprises a reinforcement phase in a shape of a preform made of the disclosed build material, and a matrix phase.

As used herein, the term "preform" refers to the whole reinforcement phase of an end-product device made of the build material irrespective of the applied manufacturing technique. The preform may be formed from the build material in the same manner as the build material is formed itself, i.e. using the same manufacturing techniques and being formed according to a predefined filling pattern. In some cases, the preform can be just a single piece of the build material.

The present build material comprises at least one continuous fiber-reinforced multifilament roving placed along the build material with a continuous repetitive or non-repetitive pattern called a filling pattern. The purpose of the filling pattern is to redistribute loads and/or improve structural integrity of the build material, or an end-product device made from it, not only in longitudinal, but also in transversal directions.

The build material and the preform can be prepared by different techniques or combinations thereof including but not limited to 3D printing techniques, 2D textile techniques and 3D textile techniques. Non-limiting examples of suitable 3D printing techniques include modified FDM, SLA, Polyjet, selective laser sintering (SLS), free-form techniques and any combinations thereof. Non-limiting examples of suitable 2D textile techniques are TFP, embroidery and any combinations thereof, while non-limiting examples of suitable 3D textile techniques include braiding, weaving, knitting, and any combinations thereof.

In 2D textile techniques, the at least one roving comprised in the build material is attached to a base material e.g. by conventional stitching, mechanical bonding (e.g. interlocking) or chemical bonding (e.g. by using an adhesive material such as glue or resin, which is further light-cured). Also, selective laser sintering can be used, if the roving is hybrid and includes thermoplastic yarns or fibers which can be melted and stick to the base material.

In some embodiments, 2D textile techniques which can be applied in the preparation of the build material or a preform typically involve stitching of the roving(s) to the base material with a stitching yarn. Suitable base materials include, but are not limited to, woven and non-woven fabrics or cloths, textile or polymer meshes, films and paper. The base material can also be manufactured by three-dimensional printing and may or may not contain reinforcing fibers. The base material itself can be recursively made by TFP, embroidery or another textile technique. In some embodiments, the base material may resemble the surface of a Velcro fastener to improve the adhesion between the build material and the matrix phase of the end-product device, or to mechanically interlock the successive layers of the build material.

Medical devices and preforms thereof are non-limiting examples of end-product devices and preforms thereof that can be made from the present build material. Any features or embodiments described herein below in the context of the build material apply to corresponding features or embodiments of end-product devices or preforms thereof, unless indicated otherwise.

Build Material

The disclosed build material is a complex article that combines the principles lying in the grounds of TFP and FDM technologies, but additionally can be used in SLA-like or PolyJet-like 3D-printing, hot-pressing, laminating and different types of molding, such as compression molding, injection molding, matrix molding or transfer molding and the like.

Unlike the filaments for the existing FDM-like composite techniques, the disclosed build material is a complex mechanically optimized article, and a single strand or piece of it already may serve a whole reinforcement for an FRC structure (e.g. a rod, a plate or other quasi-1D objects, non-limiting examples of which are shown in FIGS. 26A-26D, 27A, 27B, 28, and 33).

In its simplest form, the build material is a continuous fiber-reinforced article comprising at least one continuous multifilament roving comprising at least one braided segment. In other words, the roving may have at least partly braided structure.

As used herein, the term "a" or "an" may mean one or more. In other words, the meaning of a singular noun includes that of a plural noun. Thus, a singular term may also carry the meaning of its plural form unless otherwise specified.

As used herein, the term "at least one" refers to one or any number greater than one, including e.g. at least 2, at least 3, at least 4, at least 5, at least 10 or more. The term "at least one" is interchangeable with the term "one or more", whereas the term "at least two" is interchangeable with the term "two or more", and so forth.

As used herein, the term "multiple" refers to at least 2 or more, including, e.g., at least 3, at least 4, at least 5, at least 10 or more.

As used herein, the term "roving" refers to a long and narrow multifilament thread, yarn or other continuous bundle of fiber strands made of fibers of the same or different materials. In case of different fiber materials, the roving may be called a hybrid roving. Different segments of the fibers in the bundle may be non-braided (i.e. straight) or braided (i.e. bonded to each other by weaving, knitting or braiding, stitched together or to a base material by TFP or embroidery, or bonded to each other in some other way), irrespective whether they are of the same or different materials. Moreover, different segments of the roving may have the same or different linear densities due to variations in fibers' thickness or various filling patterns forming the whole roving. In case of embroidered, TFP or alike rovings, the rovings may comprise a base material. The terms "fiber roving", "fiber-reinforced roving", "multifilament roving", "continuous roving" and "roving" are interchangeable.

As used herein, the term "braided segment" refers to a segment of a fiber roving, wherein fibers are spatially or layerwise interlaced. In spatially (3D) braided segments, the fibers remain bonded to each other by means of interlacing as such. In layerwise (2D) braided segments, the fibers remain bonded directly to each other or to a base material by, for example, sintering, gluing or stitching. The term "braided segment" also encompasses segments, wherein two or more nested continuous multifilament fiber rovings are spatially or layerwise interlaced as set forth above. Also encompassed are braided segments made by braiding two or more nested at least partly braided rovings. Non-limiting examples of spatially braided segments are those obtained by weaving, knitting or braiding. Non-limiting examples of layerwise braided structures are those obtained by embroidery or TFP. Some braided segments can combine 3D and 2D techniques.

In some embodiments, one or more braided segments in a continuous fiber roving are non-uniformly braided, i.e. have a non-symmetric appearance. A single roving may comprise both uniformly and non-uniformly braided segments.

In some embodiments, the braided segments comprise at least two nested levels of a braided structure. In other words, the build material may be a hierarchical object meaning that the build material may comprise or consist of several nested levels of similarly or differently organized rovings. In each level, the rovings and/or fibers thereof are bonded by an appropriate 2D or 3D textile method.

In some embodiments, the build material comprising at least two rovings each comprising at least one braided segment. These two or more rovings may be bonded in different ways as exemplified in FIGS. 1-6. For example, the rovings may be bonded together at least partly for example by knitting, braiding, stitching or sintering, via external fixtures, or by an adhesive material or any combination thereof. The bonded segments may be the braided segments of the two or more rovings comprised in the build material. The bonded areas may be called joining points.

In some embodiments, the rovings or braided segments thereof are bonded together as set forth above at predefined intervals through joining points, enabling an unfolding structure between adjacent joining points. This means in practice that when the build material is in a strained state, the unfolding structures do not change the linear density of the build material. However, when the build material is in relaxed state or when adjacent joining points are pushed towards each other, the unfolding structures open outwards thereby increasing the linear density of the piece of the build material comprising the unfolding structure. The linear density in this case is calculated alongside an imaginary line passing through the joining points. Non-limiting examples of build materials comprising such unfolding structures are illustrated in FIGS. 7A, 7B, 8A and 8B. Such structures may be called "umbrella structures" or "fishnet structures" for simple illustrative expression.

The disclosed unfolding structure can improve the strength and stiffness of an end-product device in transversal direction. This also can improve the mechanical interconnection, in addition to the chemical adhesion, between adjoining pieces of the build material within a preform or between the rovings within the build material after solidification of the matrix. Unfolding can be achieved, for example, by bonding (for example, by knitting or gluing) of the rovings in the build material to each other with some intervals, resembling knitted threads in a fishnet. Such material is then placed with a combination of forward and backward movements of a manufacturing machine's printing head, so that: a knot is attached to a base material or an underlying layer of a build material in a preform; printing head is extruding the build material to a distance at least equal to the interval between adjacent knots; printing head is moving back towards the already bonded knot to a distance less than the full distance between the knots without retraction of the extruded build material and attaches the next knot to the base material or the underlying layer of the build material. Thus, the rovings in between the two adjacent knots attached to the base material or the underlying layer of the build material are forced to bend outwards the imaginary line connecting those two knots, i.e. the build material is unfolding.

Instead of knitting or other kind of bonding between separate rovings, unfolding can be achieved by a change of a hierarchical structure of the build material in a manner of a fractal. For instance, three rovings in the build material can be mutually interwoven until some point; from that point, the rovings are not interwoven anymore and are extending for some distance independently from each other; after that distance, these rovings are again interwoven, etc.

Figure 12A:
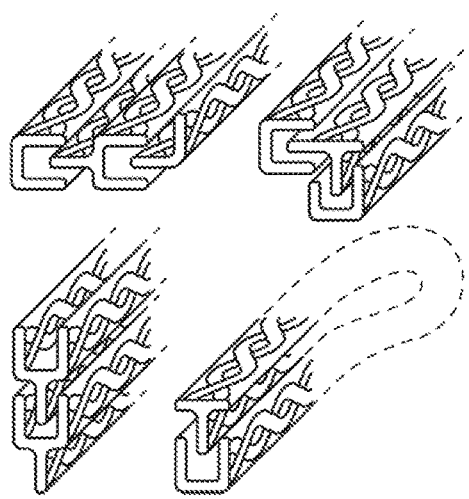
FIG. 12A depicts examples of a build material which allows stacking of its different segments.
Figure 12C:
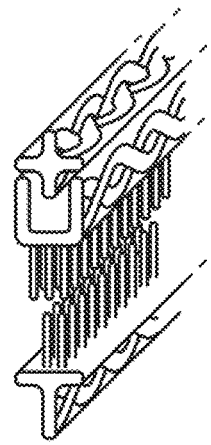
FIG. 12C exemplifies a build material which allows a combination of stacking and interlocking.
Figure 12B:
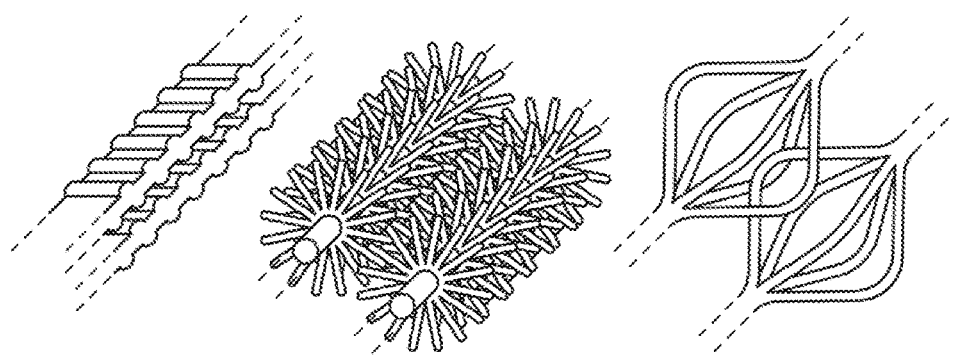
FIG. 12B illustrates examples of a build material which allows interlocking of its different segments.

Alternatively or in addition, the build material may have a cross-sectional profile that allows stacking of the segments of different layers of the build material in different planes with or without interlocking upon manufacture of a preform. Likewise, different segments of a roving comprised in the build material may have such cross-sectional profiles, allowing stacking with or without interlocking of the segments in different planes or layers in the build material. Moreover, two or more rovings in a build material can be stacked with or without interlocking in different layers or planes through such cross-sectional profiles. Such structures are exemplified in FIGS. 12A-12C.

Figure 10:
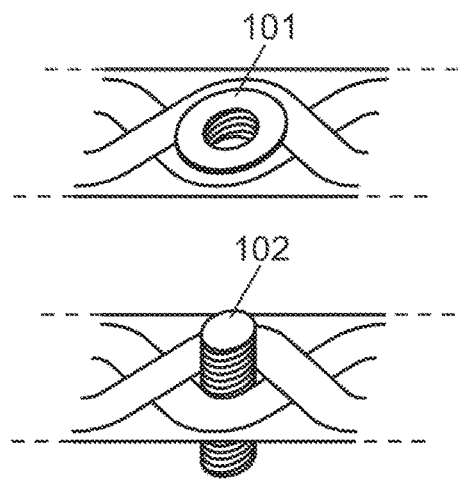
FIG. 10 illustrates examples of a build material comprising a threaded hub (101) and a threaded rod (102).
Figure 11:
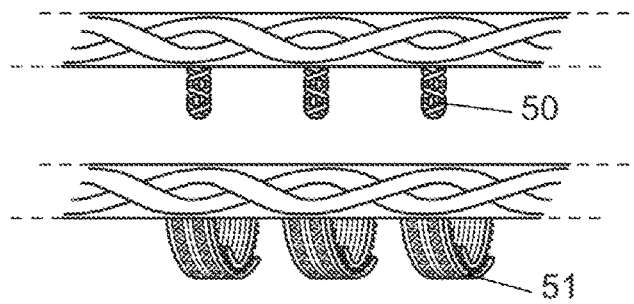
FIG. 11 shows examples of a build material comprising fixtures made from the same rovings as the build material's backbone. The fixtures have a shape of an anchor (50) and a bandage (51).

The build material can comprise one or more additional elements such as short fibers, spikes, thorns, hooks or fixtures. Non-limiting examples of fixtures include wires, nuts, threaded or plain rods, hubs, bushings and grommets. The elements may be made, without limitation of metals, ceramics, polymers or composites and attached to the build material in different ways, for example, by insertion, weaving, knitting, braiding or stitching, by using external fixtures or adhesive materials (e.g. glue or a curable resin) or by any combination of these ways of attaching, on any of the build material's nested levels of rovings. In some embodiments, fixtures can be made from the same rovings as the build material's "backbone" by special placement of the rovings. Any of the additional elements may be used for positioning and/or bonding of different layers of the build material upon manufacture of an end-product device. Non-limiting examples of build materials with such additional elements are illustrated in FIGS. 10-11.

Figure 9A:
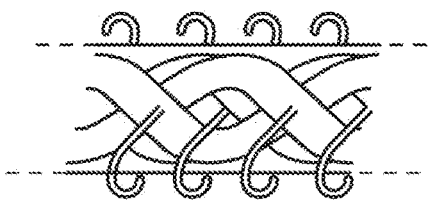
FIG. 9A illustrates examples of a build material with additional elements forming Velcro-type structure.
Figure 9B:
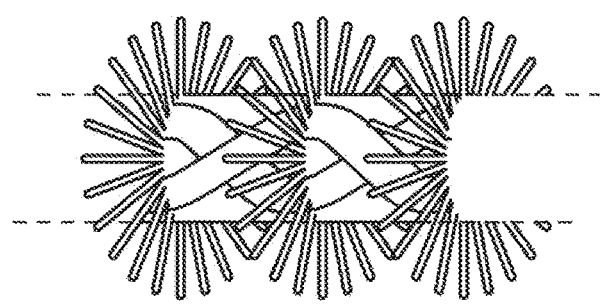
FIG. 9B illustrates an example of a "bottle brush" structure having protruding additional elements.

In some embodiments, the additional elements protrude from the main axis of the build material, thereby increasing the stiffness and strength of the build material in the transversal (i.e. relatively to the main axis of the build material) direction. Particularly suitable additional elements for this purpose include, without limitation, short fibers, spikes, thorns hooks and the like. Also, the protruding additional elements may serve to increase the adhesion and, consequently, shear strength between the adjoining pieces of the build material within a preform, or between separate rovings within the build material after solidification of the matrix material. Like other additional elements set forth above, the protruding elements can be present in any hierarchical level. Non-limiting examples of build materials comprising such protruding additional elements are illustrated in FIGS. 9A and 9B. Such structures may be called "bottle brush structures" or "hairy structures" for simple illustrative expression.

In some embodiments, at least one segment of a multifilament roving comprised in the build material or at least one of the fibers of the multifilament fiber roving forms one or more loops creating one or more apertures through the build material. In some embodiments, the segments of the rovings or the fibers thereof forming the loops have a braided structure.

Figure 13:
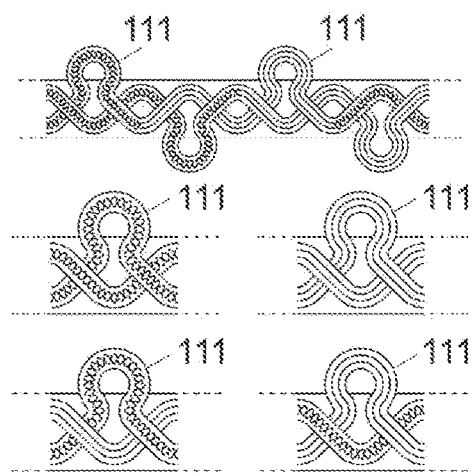
FIG. 13 shows examples of a build material comprising loops (111).
Figure 14:
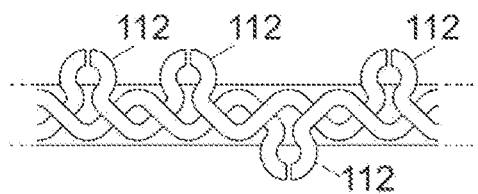
FIG. 14 illustrates an example of a build material comprising loops which are cut to create hooks of a hook-and-loop structure (112).
Figure 15A:
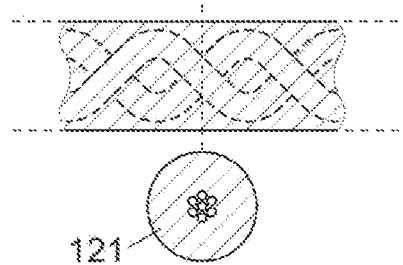
FIG. 15A illustrates an example of a 3D-braided build material embedded in thermoplastic shell (121) which eventually forms the matrix phase of an end-product device.
Figure 16A:
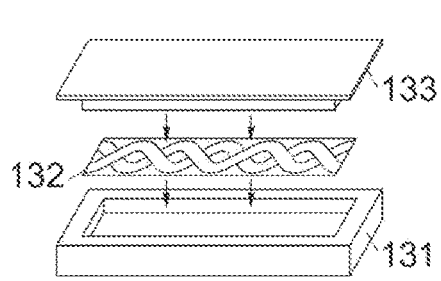
FIG. 16A illustrates formation of an end-product FRC device from a thermoplastic preform (132) in a mold (131) by compression molding.
Figure 15B:
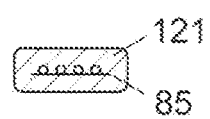
FIG. 15B shows an example of a 2D-braided build material comprising base material (85) and embedded in a thermoplastic shell (121).
Figure 16B:
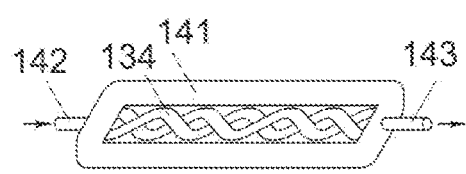
FIG. 16B illustrates formation of an end-product FRC device from a dry preform (134) in a shell (141) by transfer molding.

In some embodiments, the apertures serve as screw holes or holes for other fixtures in the end-product device; while in some embodiments, the loops are cut to create hooks for a hook-and-loop structure, i.e. a Velcro type structure. Non-limiting examples of build material with loops or cut loops are illustrated in FIGS. 13 and 14, respectively.

The at least one fiber-reinforced multifilament roving comprised in the build material may comprise fibers made from various materials. Depending on the intended use of an end-product device, the principles of sustainable development and recyclability, as well as the principle of minimum invasion in surgical treatment, may imply using of bioresorbable materials in some embodiments of the disclosed build material, whereas in some other embodiments, biostable materials or a combination of both can be used.

As used herein, the term "biostable" refers to a material that remains chemically stable and retains its initial mechanical properties when in contact with physiological fluids of living organisms and/or which is resistant to metabolic degradation by microbes when placed e.g. in soil, under normal circumstances, for many years. The term "biostable" may be used interchangeably with the term "non-bioresorbable" or "essentially non-bioresorbable".

As used herein, the term "bioresorbable" refers to a material that, when in contact with physiological fluids or some microbes, starts to degrade but preserves its mechanical properties for a certain period of time. When used in e.g. medical implants, bioresorbable materials are eventually safely absorbed and excreted by the body. In other words, bioresorbable materials disappear over time and do not require surgical removal. When used in consumer products, bioresorbable materials can be completely and safely recycled. The term "bioresorbable" may be used interchangeably with the terms "resorbable", "biodegradable", "bioerodable", and "bioabsorbable".

Suitable biostable fiber materials include, but are not limited to, glass such as S-glass, R-glass, D-glass, C-glass, E-glass and A-glass, ceramics, glass-ceramics, carbon, quartz, metals and biostable polymers.

Biostable polymers include, but are not limited to, polyethylene (PE), polypropylene (PP), polytetrafluoroethylene (PTFE), polyetherketone (PEK), polyetheretherketone (PEEK), polyvinylchloride (PVC), polymethylmethacrylate (PMMA), silicones, polyurethanes, polyethersulfone (PES), polyamides and biostable polyesters. Non-limiting examples of suitable polyurethanes include, but are not limited to thermoplastic polycarbonate-urethane (PCU), segmented polyurethane (SPU), thermoplastic silicone-polycarbonate-urethane (TSPCU), thermoplastic polyether-urethane (TPU), thermoplastic silicone-polyether-urethane (TSPU). Non-limiting example of suitable polyamides includes, but is not limited to nylon and aramids such as Kevlar. Non-limiting examples of suitable biostable polyesters include, but are not limited to polyethylene terephthalate (PET) and poly(1,4-butylene terephthalate) (PBT).

Suitable bioresorbable materials include, but are not limited to, synthetic, semi-synthetic or natural polymers. Synthetic bioresorbable polymers include, but are not limited to, aliphatic polyesters, polyethers, polyorthoesters, polyphosphoesters, polyphosphazenes, polyanhydrides, polyols, polyacetals, poly(ester amides), polyamides, poly(amino acids), poly(aspartic acid), poly(alkyl cyanoacrylates), polysiloxanes, some polyurethanes, some aliphatic polycarbonates, and copolymers thereof. Non-limiting examples of suitable aliphatic polyesters include polylactic acid (PLA), also known as polylactide, including different forms of PLA, such as poly-L-lactide (PLLA), poly-D-lactide (PDLA) and poly-DL-lactide (PDLLA); polycaprolactone (PCL); polydioxanone (PDS); polyglycolic acid (PGA) and polyglycolide (PG), optionally copolymerised with lactic acid to form poly(lactic-co-glycolic acid) (PLGA), with e-caprolactone to form poly(glycolide-co-caprolactone) (PGCL), or with tri-methylene carbonate (TMC) to form poly(glycolide-co-trimethylene carbonate) (PGA-co-TMC); and block copolymers such as PEO-PPO-PAA, PEO-PPO-PEO, PLGA-PEO-PLGA, PEG-PLG, PLA-PLGA, PEG-PCL-PEG, PEG-PLA-PEG, PEG-PLGA-PEG, PLGA-PEG-PLGA. Non-limiting examples of polyhydroxyalkanoates, polyesters produced by microorganisms, include polyhydroxybutyrates, polyhy-droxyvalerates, and copolymers thereof, more specifically poly(3-hydroxybutyrate) (PHB), poly(3-hydroxybutyrate-co-3-hydroxyvalerate) copolymer (PHBV), poly(4-hydroxybutyrate) (P4HB), poly(3-hydroxybutyrate-co-3-hydroxyhexanoate) copolymer (PHBHHx), and poly(3-hydroxyoctanoate) (PHO). Non-limiting examples of natural bioresorbable polysaccharides include gelatin, collagen, starch, hyaluronic acid, chitosan, and alginate. Further natural bioresorbable polymers include both plant-derided fibers such as vegetable fibers and cellulosic fibers, or animal-produced protein fibers such as silk, e.g. spider silk or silk produced by the larvae of the mulberry silkworm.

Bioresorbable materials also include ceramics, such as bioactive glasses (silica based or phosphate-based) produced by melting or sol-gel methods, as well as some metals, their alloys or metallic glass, e.g. Magnesium-, Iron- or Zinc-based materials.

Those skilled in the art can easily select suitable roving materials for use in the build material depending on different variables, such as application area of the eventual end-product device to be manufactured from the build material, the desired properties of thereof as well as on the technique to be applied on any step of manufacturing the end-product device. The materials set forth above may be used not only in the rovings but also in the base material (if present), in the stitching yarn (if present), in the additional elements (if present) and/or in the matrix phase.

In some embodiments, the build material comprises matrix material. The matrix material can be selected from the group consisting of pure polymers, polymer blends, copolymers, interpenetrating or semi-interpenetrating polymer networks; metals or metal alloys; and ceramic materials. According to the properties of the selected fibers' material and intended use of end-product devices, the matrix material can be biostable or bioresorbable. Those skilled in the art can easily select suitable matrix materials for use in the build material depending on different variables, such as application area of the eventual end-product device to be manufactured from the build material, the desired properties thereof, as well as on the technique to be applied on any step of manufacturing the end-product device.

Polymers are a preferred choice for the matrix material comprised in the build material. Depending on their chemical properties, the polymeric matrix materials can be generally divided into two groups: thermosetting and thermoplastic polymers.

A thermosetting matrix, often called a thermoset, refers to a type of curable matrix substances that are irreversibly hardened by curing from a soft solid or viscous liquid prepolymer or resin. A thermoset is usually designed to be molded into the final shape. Curing is induced by heat or other suitable radiation and may be promoted by high pressure or mixing with a catalyst. Once hardened, a thermoset cannot be melted for reshaping.

Non-limiting examples of biostable thermosetting matrix substances include epoxies such as epoxy acrylate, and acrylates such as dimethacrylates and methacrylates including, but not limited to, methyl acrylate, methyl methacrylate, methacrylate functionalized dendrimers, glycidyl dimethacrylate (bis-GMA), triethylene glycol dimethacrylate (TEGDMA) and urethane dimethacrylate (UDMA), and any mixtures (polymer blend) or chemically bonded combinations (copolymers) thereof.

Bioresorbable thermosetting materials include, but are not limited to, substituted, unsubstituted, or functionalized initially thermoplastic polyesters, such as polycaprolactone (PCL), polylactide (PLA), polyglycolide (PGA) or any mixtures (polymer blend) or chemically bonded combinations (copolymers) thereof functionalized with fumarate, acrylate or methacrylate groups to obtain cross-linkable thermoset.

A thermoplastic matrix, often called a thermoplastic, refers to a polymeric material that becomes pliable or moldable at a certain elevated temperature and solidifies upon cooling.

Biostable thermoplastic materials include, but are not limited to, polyethylene (PE), polypropylene (PP), polytetrafluoroethylene (PTFE), polyetherketone (PEK), polyetheretherketone (PEEK), polyvinylchloride (PVC), polymethylmethacrylate (PMMA), silicones, polyurethanes, polyethersulfone (PES), polyamides and biostable polyesters. Non-limiting examples of suitable polyurethanes include but are not limited to thermoplastic polycarbonate-urethane (PCU), segmented polyurethane (SPU), thermoplastic silicone-polycarbonate-urethane (TSPCU), thermoplastic polyether-urethane (TPU), thermoplastic silicone-polyether-urethane (TSPU) and any mixtures (polymer blend) or chemically bonded combinations (copolymers) thereof. Non-limiting example of suitable polyamides includes but is not limited to nylon and aramids such as Kevlar. Non-limiting examples of suitable biostable polyesters include, but are not limited to polyethylene terephthalate (PET) and poly(1,4-butylene terephthalate) (PBT).

Bioresorbable thermoplastic materials include, but are not limited to, synthetic, semi-synthetic or natural polymers. Synthetic bioresorbable polymers include, but are not limited to, aliphatic polyesters, polyethers, polyorthoesters, polyphosphoesters, polyphosphazenes, polyanhydrides, polyols, polyacetals, poly(ester amides), polyamides, poly (amino ac-ids), poly(aspartic acid), poly(alkyl cyanoacrylates), polysiloxanes, some polyurethanes, some aliphatic polycarbonates, and copolymers thereof. Non-limiting examples of suitable aliphatic polyesters include polylactic acid (PLA), also known as polylactide, including different forms of PLA, such as poly-L-lactide (PLLA), poly-D-lactide (PDLA) and poly-DL-lactide (PDLLA); polycaprolactone (PCL); polydioxanone (PDS); polyglycolic acid (PGA) and polyglycolide (PG), optionally copolymerised with lactic acid to form poly(lactic-co-glycolic acid) (PLGA), with e-caprolactone to form poly(glycolide-co-caprolactone) (PGCL), or with tri-methylene carbonate (TMC) to form poly(glycolide-co-trimethylene carbonate) (PGA-co-TMC); and block copolymers such as PEO-PPO-PAA, PEO-PPO-PEO, PLGA-PEO-PLGA, PEG-PLG, PLA-PLGA, PEG-PCL-PEG, PEG-PLA-PEG, PEG-PLGA-PEG, PLGA-PEG-PLGA. Non-limiting examples of polyhydroxyalkanoates, polyesters produced by microorganisms, include polyhydroxybutyrates, polyhy-droxyvalerates, and copolymers thereof, more specifically poly(3-hydroxybutyrate) (PHB), poly(3-hydroxybutyrate-co-3-hydroxyvalerate) copolymer (PHBV), poly(4-hydroxybutyrate) (P4HB), poly(3-hydroxybutyrate-co-3-hydroxyhexanoate) copolymer (PHBHHx), and poly(3-hydroxyoctanoate) (PHO). Non-limiting examples of natural bioresorbable polysaccharides include gelatin, collagen, starch, hyaluronic acid, chitosan, and alginate.

In some embodiments, the matrix material can be an interpenetrating polymer network (IPN), i.e. a polymer comprising two or more thermosetting polymer networks which are at least partially interlaced on a molecular level but not chemically bonded. If at least one of the networks is a thermoplastic polymer network, the resulting substance is called semi-interpenetrating polymer network (semi-IPN).

In some embodiments, the matrix material is comprised in the build material. Conventionally, the term "pre-impregnated FRC" is used with respect to such a type of FRC structures, namely the ones soaked with a liquid prepolymer substance, typically with a thermoset. The matrix phase of such FRC structures solidifies after complete polymerization of the prepolymer.

As used herein, the term "pre-impregnated" is extended and refers to any build material or complete preform of an end-product device comprising the matrix material. Alternatively, the build material may be provided in dry state, i.e. without being pre-impregnated. The terms "pre-impregnated" and "prepreg" are interchangeable.

As used herein, the term "thermosetting prepreg" refers to a build material or a preform of an end-product device, soaked with a thermosetting prepolymer substance which, typically irreversibly, solidifies after complete polymerization of the prepolymer.

As used herein, the term "thermoplastic prepreg" refers to a build material or a preform of an end-product device, comprising a thermoplastic polymer.

As used herein, the term "prepolymer" refers to a single monomer or a mixture (system) of monomers, which have not been preliminarily reacted, or have been reacted to obtain some intermediate state of the final polymer. Prepolymer is capable of further polymerization to obtain a completely cured polymer. The final polymer can be a pure polymer, a copolymer or a blend of more than one different polymer, an IPN or a semi-IPN.

Non-limiting examples of prepolymers suitable for manufacturing of prepreg build materials or preforms are pure unreacted thermosetting acrylic monomers or mixtures of such monomers such as glycidyl dimethacrylate (bis-GMA), triethylene glycol dimethacrylate (TEGDMA) and urethane dimethacrylate (UDMA); unreacted epoxy resins; mixtures of unreacted thermosetting monomers and unreacted thermoplastic monomers or dissolved thermoplastic polymers, such as a mixture of bis-GMA and PMMA; unreacted functionalized polyesters such as PLA, PGA or PCL functionalized with fumarate, acrylate or methacrylate group, mixture of such polyesters or mixture of such polyesters and acrylic monomers. Partially reacted monomers or oligomers of different types which are still capable of further polymerization can also be used.

In automated manufacturing of end-product devices, the thermosetting prepreg build material can be used in freeform printing and modified SLA-like or Polyjet-like printing (as described in EP 3 022 046 B1 by Markforged Inc). For FDM-like techniques, embedded thermoplastic prepreg is, in fact, an inherent type of build material. However, conventional manufacturing machines should be configured for feeding the complex structurally optimized build material instead of or in addition to their standard build materials. Different types of molding e.g. transfer molding dealing with infusion of thermosetting liquid resin or compression molding or hot-pressing dealing with thermoplastic materials can also be used with the prepreg build material.

Even when used in dry state, the interconnected complex structurally optimized build material possesses better structural integrity, unlike a simple bundle of unidirectional fibers like in conventional FDM-like techniques, especially in turns or loops of the filling pattern. Thus, the disclosed build material can be easily placed into a sophisticated self-supporting structure without impregnation of the whole structure into matrix material, just by selective fixation in a few control points. Such fixation can be made, for instance, by stitching or gluing. In that case, a skeleton-like 3D structure can be produced for further vacuum molding or resin infusion.

The above-mentioned property of the disclosed build material can also help in reducing the need for any kind of supporting structures, typically employed in conventional 3D printing. To further reduce this need, it is beneficial to provide a non-planar base surface which, for example, would repeat the surface of a bone underlying the implant. This can be provided by use of morphing surfaces similar to the so called "morphing table" suggested by MIT as a building bed in an AM machine. Other physical principles can also be employed to provide controllable shaping of the building bed.

In some embodiments, the matrix material in the thermosetting prepreg build material may be a mixture of oligomers, interpenetrating or semi-interpenetrating polymer network which has liquid state at normal conditions and gets cured when exposed to ultra-violet (UV), visual light (VL), infra-red (IR) or other type of electromagnetic radiation (EMR). If resin viscous enough is used, like semi-IPN, a piece of such build material may serve as an in situ shapable and curable implant (e.g. a plate for maxillofacial reconstruction). In situ means placing of an uncured medical device on an exposed bone or on the skin of the part of body which should be fixed with that device, shaping of the device against the underlying surface and curing of it without removing the device. Alternatively, the in situ shaped device may be removed for curing in clinical premises, such as in the operation theatre, and returned on the exposed bone or skin in a cured state and, if needed, fixed on its place using appropriate means of fixation.

In some embodiments of a thermoplastic prepreg build material, the matrix material is provided by employing one or more multifilament fiber roving comprising thermoplastic fibers. Such thermoplastic fibers or yarns will become the matrix of an end-product device after e.g. hot-pressing of the preform. Such a build material is referred to as "hybrid-yarn prepreg".

Another special case of a thermoplastic prepreg build material is the build material embedded in a hardened but flexible thermoplastic polymer shell in a manner similar to printing build materials used in FDM-like technique suggested by Markforged in EP 3 022 046 B1. In this build material, the thermoplastic shell at least partially encloses the fiber rovings comprised in the build material and remains in solid state at normal conditions, while gets melted when heated. The thermoplastic shell possesses such mechanical properties (elasticity and strength) at normal conditions, which allows storage and handling of the build material in FDM-like 3D-printing process in a manner like conventional FDM printing filament is stored and handled. Such a build material is referred to as "embedded build material" or "embedded prepreg".

In some embodiments, the build material may comprise one or more voids, i.e. hollow spaces within the build material, for different purposes. The voids may be completely enclosed within the build material with no connection to an outer surface, or they may be connected to an outer surface of the build material.

The purpose of the voids may vary. For example, they may be used to adjust mechanical properties and/or weight of the build material or an eventual end-product device, or to hold inserts, such as inserts comprising autograft bone, xenograft bone or preferably allograft bone, fully or partly demineralized bone matrix (DBM), synthetic bone substitutes such as calcium phosphate-based ceramics, bioactive glasses, bioactive glass-ceramics, composites of bioactive glasses or glass-ceramics and bioresorbable polymers. Non-limiting examples of calcium phosphate-based ceramics include hydroxyapatite (HA), α-tricalcium phosphate (α-TCP), β-tricalcium phosphate (β-TCP) and biphasic calcium phosphates (BCP) which consist of mixed HA and TCP phases in different ratios. Said allograft, autograft or xenograft bone may be provided e.g. in the form of chips, strips, granules or the like, whereas said DMB may be derived from cortical, cancellous and/or corticocancellous, preferably allogenic bone tissue. Moreover, the inserts may comprise a scaffold for tissue regeneration, musculoskeletal grafts, i.e. transplantable tissues comprising bones and/or tendons, and/or any desired active agents.

In some embodiments, the build material may comprise one or more voids for delivery, preferably timed-release delivery, of bioactive substances in the body. Such bioactive substances include, but are not limited to, osteogenic agents that enhance bone regeneration and/or medicaments that promote healing of the bone repair site. Further bioactive substances include, but are not limited to, medicaments such as antibiotics, immunosuppressants, immunostimulators and anti-inflammatory agents, proteins such as osteocalcin, osteoglycin and growth factors such as bone morphogenic proteins (e.g. BMP-2, -4, -6, -7 and -9), fibroblast growth factors (FGFs), vascular endothelial growth factors (VEGFs), platelet derived growth factors (PDGFs), and transforming growth factors, such as TGF-β, antimicrobial agents such as antifungal agents, antibacterial agents and antiviral agents, and nanoparticles such as silver.

In some embodiments, said one or more voids may be used for delivering cells to the bone repair area. Non-limiting examples of cell types to be delivered include one or more of stem cells such as mesenchymal stem cells, bone marrow stromal cells, osteoprogenitor cells, osteoblasts, osteocytes, and osteoclasts. The cells may be either autogenic or allogenic.

In some cases, rovings may comprise bioactive agents packed in any appropriate package, which can be woven into the build material. Such a package, for instance, can resemble sausages or beads. In some cases, the fibers constituting the rovings can be bioactive themselves.

Figure 17:
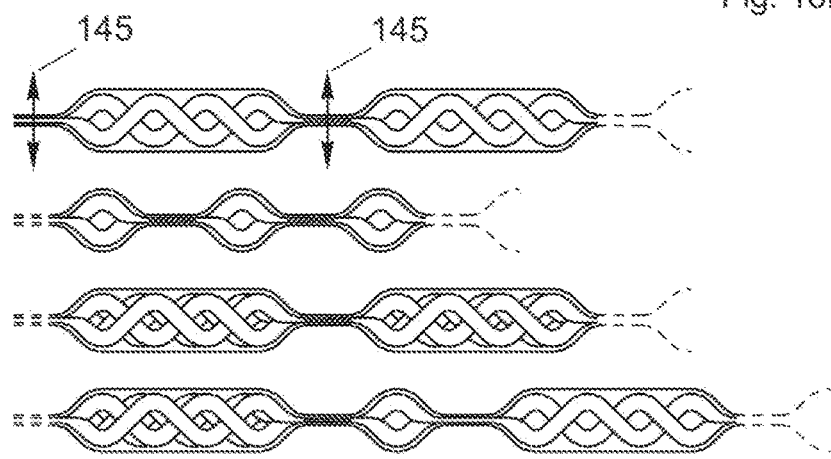
FIG. 17 illustrates examples of a beads-like build material.
Figure 18A:
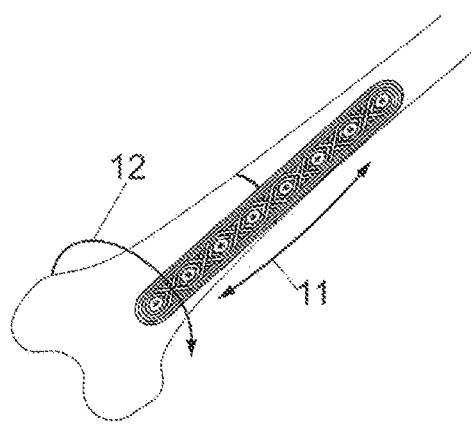
FIG. 18A illustrates forces acting upon a load-bearing fixation plate manufactured out of a continuous build material: primary loading in bending (11), secondary loading in torsion (12).
Figure 18B:
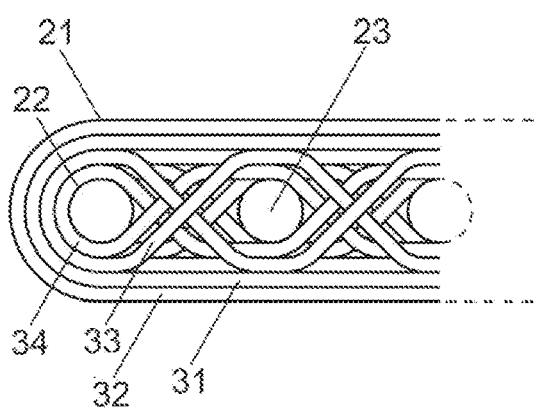
FIG. 18B illustrates a load bearing medical device manufactured out of a continuous build material with an outer border (21), an inner border (22) and an aperture (23). Respective functionalized placement of a continuous build material in the device: primary reinforcing segment (31), segment with combined primary reinforcing and contouring functions (32), secondary reinforcing segment (33), segment with combined secondary reinforcing and contouring functions (34).
Figure 19:
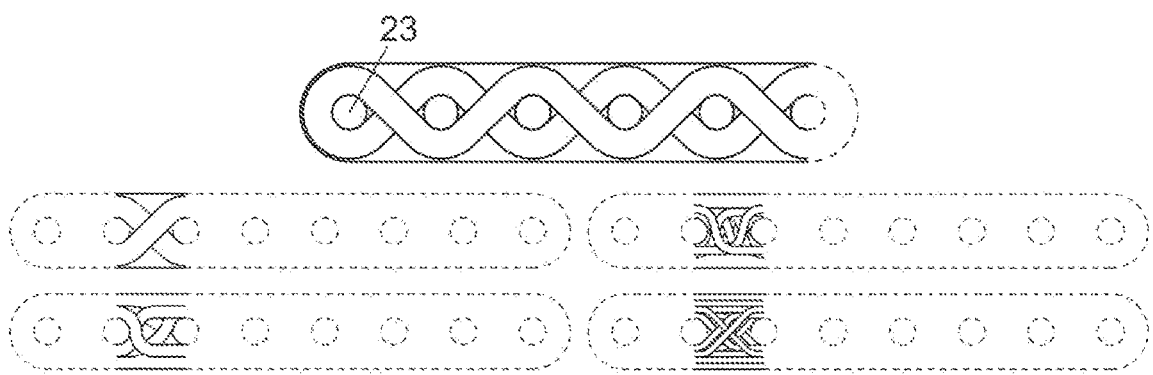
FIG. 19 shows examples of functionalized spatial arrangement of a continuous build material in load-bearing composite plates.
Figure 20:
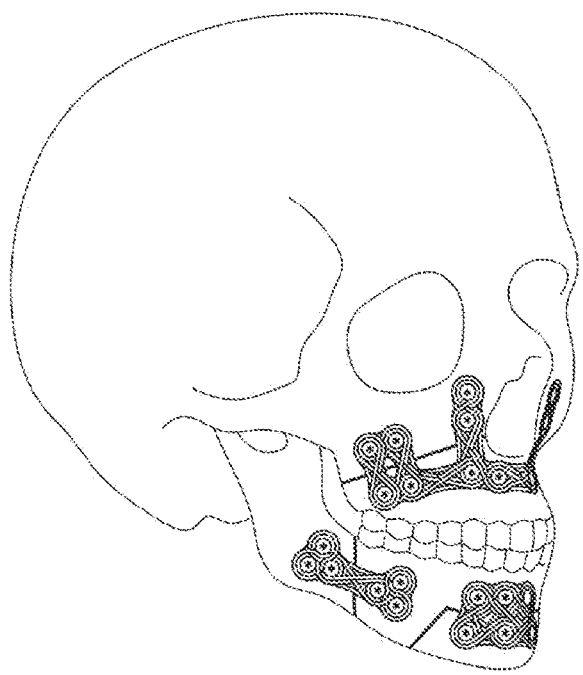
FIG. 20 shows examples of composite implants for patient-specific guides and plates for maxillofacial applications.
Figure 21:
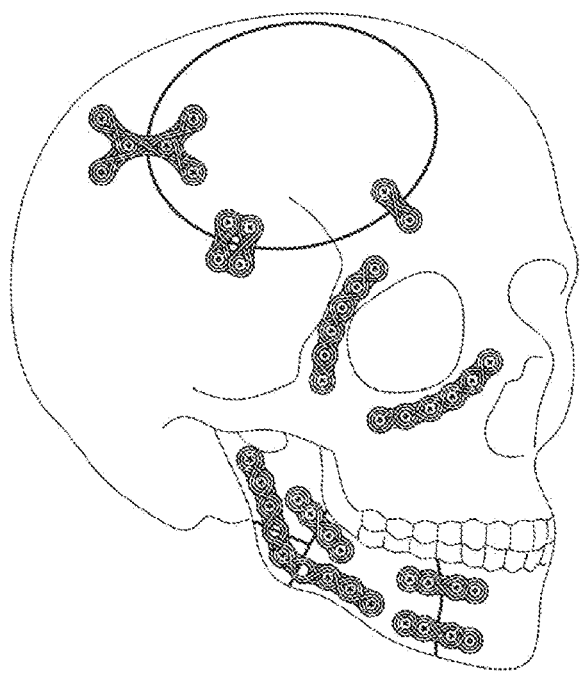
FIG. 21 shows examples of composite fracture fixation plates for cranial and maxillofacial applications.
Figure 22:
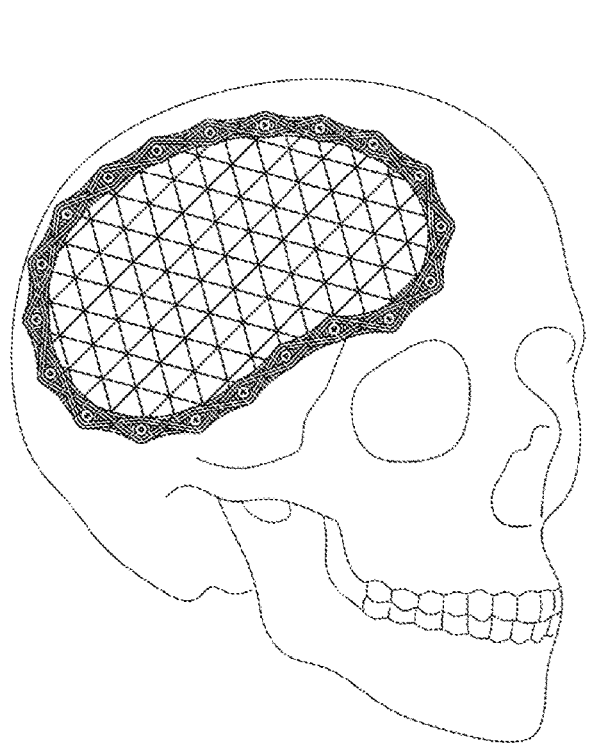
FIG. 22 shows an example of a patient-specific composite cranial implant.
Figure 23:
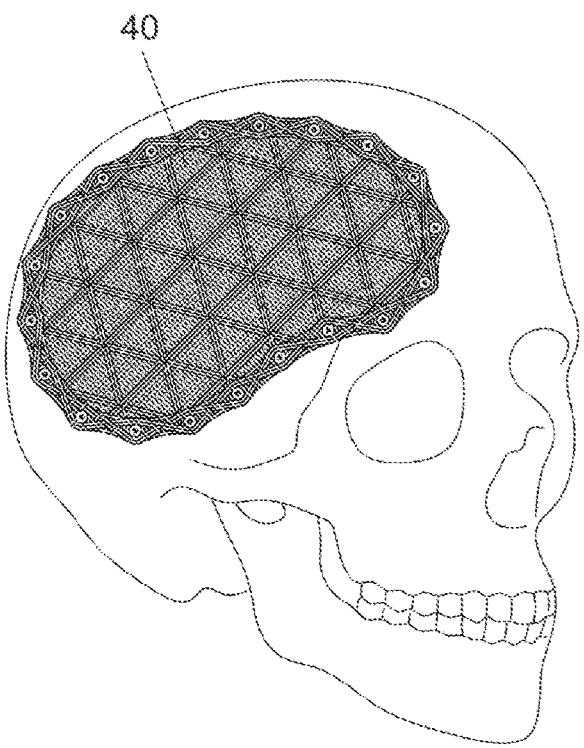
FIG. 23 shows an example of a patient-specific composite cranial implant with inserts (40) comprising, e.g., autograft, allograft, xenograft, synthetic bone substitute, scaffold for tissue regeneration and/or other active agents.

The continuous build material, e.g. when intended for manufacturing of simple quasi-1D structures, can itself be prepared in a manner of beads or a chain (as illustrated in FIG. 17). Thus, it can be easily cut by hands and used as a preform of an end-product device without forming more complex preforms in AM machines. For instance, such a preform can be solidified in a mold, a soft shell or on air.

In some further embodiments of any of the above-disclosed embodiments, the braided segment may extend the whole length of the continuous build material. In other words, the build material may in some embodiments have a fully braided structure, i.e. be fully braided instead of being only partly braided. Partly braided structures comprise one or more braided segments intervened by non-braided or straight segments.

End-Product Medical Device

As set forth above, owing to its versatile structure the present build material may be used for manufacturing practically any end-product device that is to be manufactured by any 3D printing technique, 2D textile technique or 3D textile technique. Thus, as used herein, the term "end-product device" refers to a device fabricated from the present build material by any appropriate AM technique and is ready to be used. The end-product device comprises a reinforcement phase in a shape of a preform made of the suggested build material and a matrix phase.

In some embodiments, the end-product device is a fiber-reinforced medical device, especially a medical device intended for the management and treatment of musculoskeletal and dental disorders. The medical device may be applied for both human and veterinary clinical applications.

As used herein, the term "medical device for the management and treatment of musculoskeletal and dental disorders" refers to a musculoskeletal or dental device such as an implant or an external device. As used herein, the term "implant" refers to an invasive medical device made from one or more biomaterials intentionally placed within the body, temporarily or permanently. As used herein, the term "external device" refers to a partially invasive or non-invasive medical device comprising one or more biomaterials intentionally placed outside the body, temporarily or permanently. The terms "medical device for the management and treatment of musculoskeletal and dental disorders", "end-product medical device" and "medical device" are interchangeable.

As used herein, the term "treatment of musculoskeletal disorders" encompasses any bone repair related purposes, such as healing of fractures, especially multiple or complex fractures or those that do not heal well after an initial treatment, repair of bone defects, i.e. regeneration of bone lost to disease, infection, or injury, as well as healing of bone tissue around surgically implanted devices, like joint replacements, plates, or screws. Such a treatment may be applied to any area or part of the body, and include, for instance, orthopaedic, aesthetic and veterinary purposes.

As used herein, the term "treatment of dental disorders" encompasses any tooth restoration related purposes, such as tooth replacement and restoration and replacement of missing tissues.

The term "management of musculoskeletal disorders", in turn, encompasses prevention or reducing the risk of fractures in subjects having an increased risk of fractures, e.g. owing to a predisposing disease or medical condition. External fracture management devices are particularly suited for this purpose.

Accordingly, in some embodiments, the invention provides a method for bone regeneration in a subject in need thereof by implanting or otherwise applying a medical device of the invention to a bone defect or repair site. Also provided is a corresponding method for the treatment of musculoskeletal or dental disorders, as well as a method for the management of musculoskeletal disorders in a subject in need thereof, wherein by implanting or otherwise applying a device of the invention to a site at risk.

As used herein, the term "subject" includes, but is not limited to, mammals such as humans, as well as domestic animals such as livestock, pets, race horses and other sporting animals. Examples of such animals include without limitation carnivores such as cats and dogs; swine, including pigs, hogs, and wild boars; ruminants and/or ungulates such as cattle, oxen, sheep, giraffes, deer, goats, bison, and camels; and horses.

The medical device disclosed herein is made from the present build material by functionalized spatial arrangement to create a preform of the medical device, such that different segments of the build material serve different functions. Preferably, the arrangement comprises at least three different segments, wherein a first segment is placed in the direction of bending of the medical device, a second segment is placed in the direction of torsion of the medical device and a third segment is placed along at least one of the borders of the medical device.

Accordingly, the medical device is made from a build material having segments of three main types:

i) Primary reinforcing segments are placed so that they are directed along the main tensile stresses occurring within the medical device in the loaded state considered as the most probable one. Usually, pure tension or bending are the main loading mode.

ii) Secondary reinforcing segments are placed so that they bridge together the sides of the medical device subjected to the second most probable loading mode. Usually, torsion or in-plane shear are the secondary loading mode.

iii) Contouring segments are placed to surround the medical device from outside and inside, including inner cutoffs such as apertures (e.g. screw holes) or functional voids, to provide additional structural integrity to the build material and prevent, e.g., tearing of the structure or avulsion of the screws or fixtures (e.g., grommets or hubs).

In some embodiments, any of the segments may have one or more of the above-mentioned functions simultaneously (e.g., the contouring segment lying in the direction of the main tensile stress will also work as a primary reinforcing segment).

In some embodiments, different segments of one and the same build material may have different functions, depending on their position within the structure. Accordingly, said at least one strand of the build material within one level of the medical device is spatially placed in one layer or more layers interconnected and/or non-interconnected with each other.

The medical device may be prepared by the same techniques as the build material and the preform of the medical device, i.e. by 3D printing techniques, 2D textile techniques and 3D textile techniques explained above. In case of 2D and 3D techniques, the preparation of the medical device involves either direct solidification of the matrix material comprised in the build material or in the preform (i.e. by being in the form of a prepreg); or if the build material or the preform is in dry form, addition of matrix material to the build material and the preform followed by solidification of the matrix material to create a medical composite device.

Solidification of the matrix material may be achieved by curing, i.e. through polymerization or cross-linking of the matrix using, for example, electromagnetic radiation, thermal radiation or mechanical stimulation, or by relying on autopolymerization of self-curing matrix materials. Non-limiting examples of electromagnetic radiation include X-rays, microwaves, and light such as visible blue light or ultraviolet (UV) light. A non-limiting example of mechanical stimulation is ultrasound. Also, chemical curing may be employed.

In some embodiments, solidification of the matrix material may be carried out in a mold, in a soft removable or permanent shell, on air or in a combination thereof.

Any of the matrix materials discussed in the context of the build material or the preform may be used as a matrix material in the end-product medical device.

Figure 24:
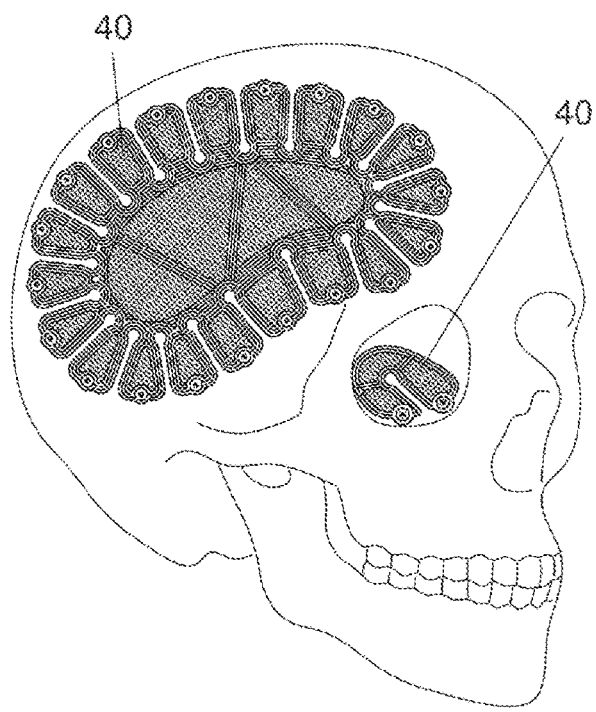
FIG. 24 shows examples of in situ shapeable patient-specific composite cranial and orbital implants with inserts (40) comprising, e.g., autograft, allograft, xenograft, synthetic bone substitute, scaffold for tissue regeneration and/or other active agents.
Figure 25:
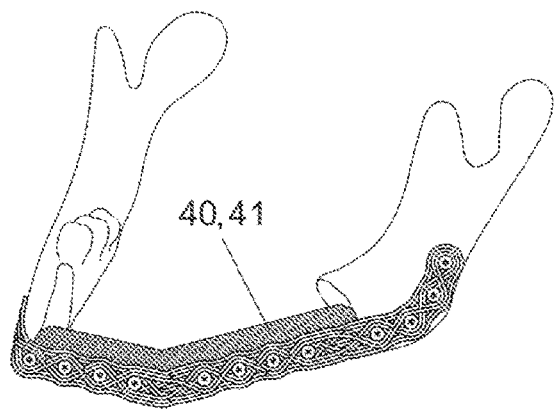
FIG. 25 shows an example of a patient-specific load-bearing composite mandibular implant with inserts (40) comprising, e.g., autograft, allograft, xenograft, synthetic bone substitute, scaffold for tissue regeneration and/or other active agents, and/or musculoskeletal grafts (41).
Figures 26A, 26B, 26C, 26D:
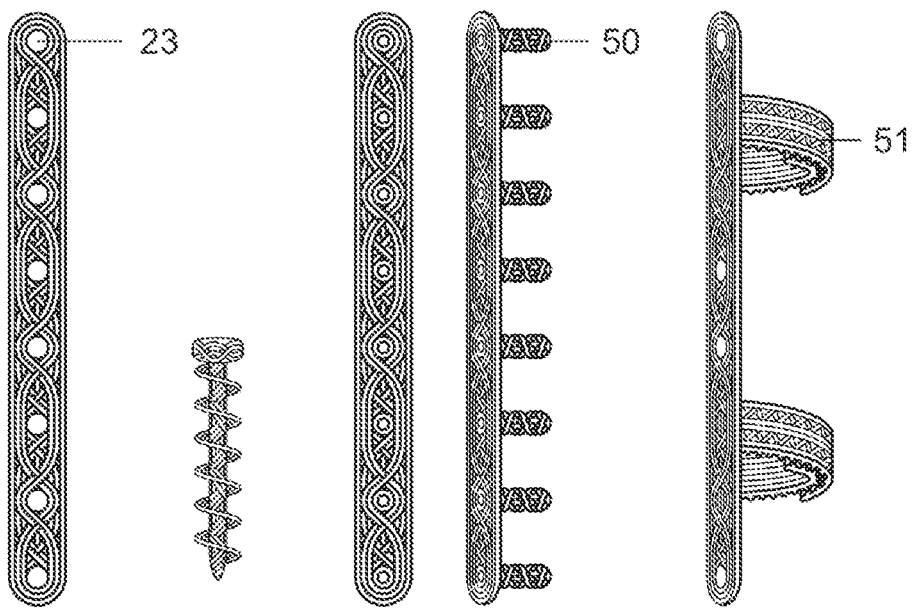
FIG. 26A shows an example of a composite fracture fixation plate to be fixed with fixtures such as standard metallic screws.
FIG. 26B illustrates an example of a medical device, wherein the device is in the form of a composite screw.
FIG. 26C shows an example of a composite fracture fixation plate made from a continuous build material and having composite anchors (50) made from the same rovings as the build material's backbone.
FIG. 26D shows an example of an external fixation device made from a continuous build material and having bandages (51) made from the same rovings as the build material's backbone.
Figures 27A, 27B, 28, 29:
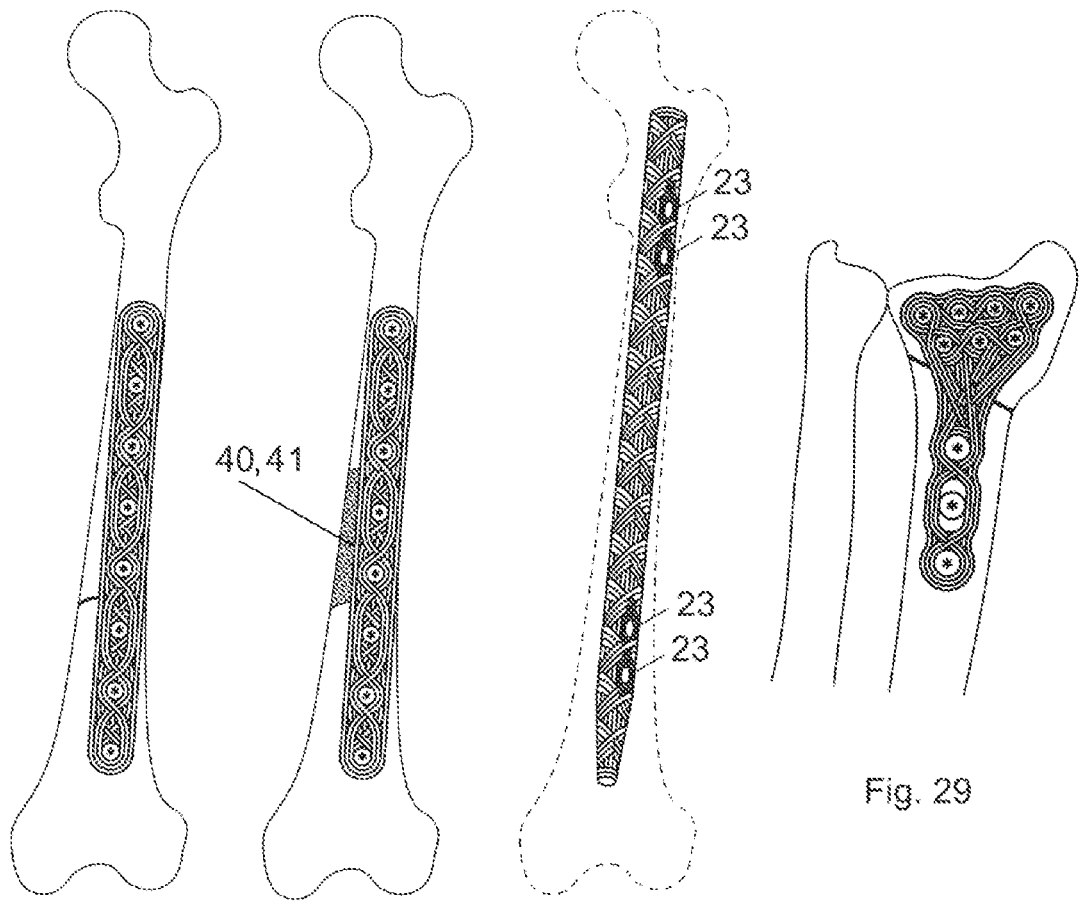
FIG. 27A shows an example of a load-bearing composite plate for fracture fixation.
FIG. 27B shows an example of a load-bearing composite plate for the treatment of large segmental defects with inserts (40) comprising, e.g., autograft, allograft, xenograft, synthetic bone substitute, scaffold for tissue regeneration and/or other active agents, and/or musculoskeletal grafts (41).
FIG. 28 exemplifies a medical device in the form of a load-bearing composite intramedullary nail.
FIG. 29 shows an example of a composite implant for the treatment of the fractures of distal radius.
Figures 34, 35:
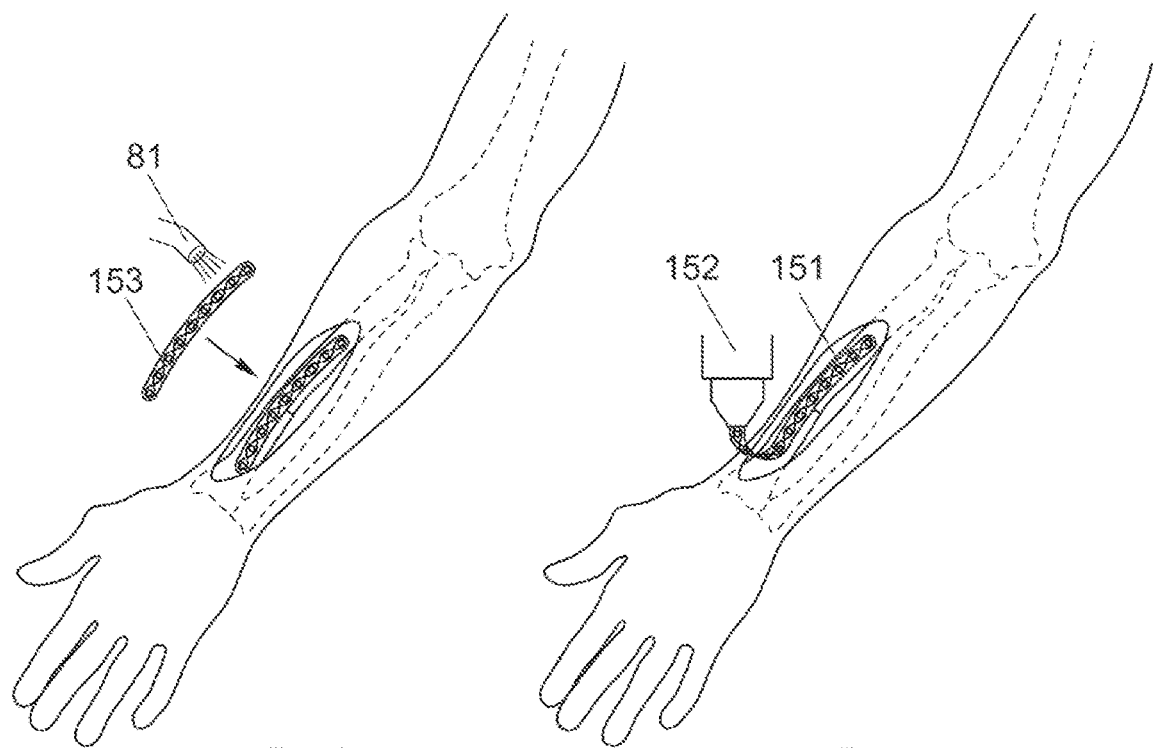
FIG. 34 shows a medical device comprising a thermosetting prepreg preform (153), being cured in situ by EMR coming from an emitter (81).
FIG. 35 shows in situ FDM-like printing of a medical device out of a continuous thermosetting prepreg build material (151).

Optionally, the device may comprise one or more apertures, i.e. hollow areas that extend through the device. The apertures in the medical device may serve different functions. In some embodiments, the apertures serve as fixture holes for external fixtures, such as screws, pins and the like for securing the device in its place in the body. Alternatively or in addition, the apertures may be provided for attachment to another object, such as another medical device. In some embodiments, said apertures may be provided in one or more protruding flanges. One flange may contain one or more apertures. Moreover, one or more of the flanges may be flexible to provide tight fitting with the bone defect area to be treated. A non-limiting example of an implant with flexible flanges comprising said fixation areas is illustrated in FIG. 24.

In some embodiments, at least some of the apertures are bypassed by the third segment, i.e. the contouring segment, of the build material.

In those embodiments, wherein one or more apertures (23) are provided for fixation purposes, the distance of the middle of the segment of a build material bypassing an aperture (23), such as a screw hole, from the center of said aperture (23) is shorter than the radius of the head of a fixture to be used for securing the implant to its place in situ. The main purpose of such a segment of the build material is to bear pressure from the fixture head.

Like the build material and the preform, the medical device may optionally comprise one or more fixtures such as wires, nuts, threaded or plain rods, hubs, bushings and grommets, made of metals, ceramics, polymers or composites discussed in more detail in the context of the build material. One or more of said fixtures may be embedded in the matrix and may or may not be interconnected with the build material or preform. Alternatively or in addition, one or more of the fixtures may attached to the medical device by insertion. A device comprising protruding anchors (50) is exemplified in FIG. 26C.

Like the build material and the preform, the medical device may optionally comprise one or more voids for different purposes. Any features, purposes and possible contents of the voids disclosed in the context of the build material apply to those in the end-product medical device and in a preform thereof.

In some embodiments, the medical device of the invention may comprise electronic components such as sensors, transducers, light-emitting diodes, transmitters and the like placed within the content of the device.

The end-product medical device maybe provided in any appropriate shape or form depending on the nature of the disorder to be treated or managed. Non-limiting examples of devices include bone plates, bone screws, anchors, intramedullary pins, orthopaedic wires, dental disks and implants, periodontal splints, orthodontic retainers, provisional bridges, dental posts, tooth stumps, cranial implants, spinal cages, osteotomy wedges, devices for maxillo-facial reconstructions, patches and tapes. Non-limiting examples of some device types are illustrated in FIGS. 20-33.

Machine for Manufacturing of the Build Material

Also provided is a machine for the preparation of the complex structurally optimized build material that represents a further modification of the existing TFP or technical embroidery machines. Conceptually, the way in which said machine places fiber rovings on a continuous base material resembles the way in which a kinemetric seismograph records the oscillations on a paper roll.

The machine is a modular system. The overall set of modules is defined by a customer and may vary depending on the customer's needs. Ultimately, the modular machine comprises up to five modules, of which two are mandatory modules and three are optional ones. To be more specific, the machine comprises:

a first module comprising a base material feeder for feeding continuous base material for the continuous fiber-reinforced build material into a material forming area and removing of a ready build material from the material forming area; and one or more second modules comprised in the material forming area, each comprising a device for placing one or more fiber rovings on the base material according to a filling pattern, wherein the build material is being assembled from the base material and the one or more fiber rovings; and optionally, one or more third modules comprised in the material forming area, each comprising a device for installation of additional elements, or a cutting device for cutting of the build material or the fiber rovings comprised in the build material; and optionally, one or more fourth modules comprised in the material forming area, each comprising a bath for pre-impregnation of the build material in a liquid prepolymer; and optionally, a fifth module comprising a device for manufacturing of an end-product device. Notably, a single machine can comprise multiple sets of the modules set forth above.

A first module is mandatory and is a backbone of the whole machine as a construct. It provides feeding of a base material into a material forming area of the machine and collection of the ready build material after passing a material forming area. The material forming area is a zone of the machine in which the build material is being assembled from its components, i.e. a base material, fiber rovings and additional elements (if present). The material forming area comprises a second, and optionally a third and a fourth modules. The second module is mandatory, and it is configured to provide placing of fiber rovings on the base material. The third module is optional, and it may in some embodiments be configured to serve for placing additional elements on the base material. The fourth module is optional and is configured for the preparation of a prepreg build material from a dry build material which is formed in modules 1 to 3. The fifth module is optional and is a device-production module, in which the prepared build material can be virtually immediately employed to form an end-product device.

A first module includes: a basement (161) which is a skeleton on which the whole machine is assembled; a base material feeder which in turn comprises a spool (163) with the base material (85); a system of rollers (165) which provide feeding the base material (85) in necessary direction with necessary tension and speed; a spool (164) on which the ready build material (151) is spooled after placing fiber rovings (168) and addition elements or fixtures (if present) on the base material (151).

During the manufacturing process, a virtually endless band of base material (85) of a certain width, packed in a spool (163), is fed into a material forming are through a system of rollers (165) in a manner of conveyor belt. The continuous base material (85) may be, for example, in a form of a continuous band of thin and flexible sheet material, such as woven fabric, non-woven fabric, textile, mesh or polymer film.

In some embodiments, the base material (85) goes through a number of sequentially installed sewing blocks (162) comprised in a material forming area, capable of moving transversely to the direction of feeding of the base material (85). Each of the sewing blocks (162) is a mandatory second module of the machine and comprises a needle (173), a shuttle mechanism (172), a stitching yarn feeder and a fiber roving feeder (174). In general, the sewing blocks (162) are normal sewing machines with some modifications. In each sewing block (162), a separate virtually endless fiber roving is fed from a separate spool (166) and stitched to the base material (85) according to a filling pattern. The stitching may be carried out using a stitching yarn (84), for example, a monofilament or multifilament textile yarn, polymeric yarn, metal yarn or wire. The sewing block (162) represents an independent block which can move within a certain range transversely to the direction of feeding of the base material (85). This move can be provided, for example, by helical gear (178) and be driven by, e.g., electric motor. In other embodiments, the sewing block (162) can be moved by means of hydraulic or pneumatic cylinder. Sewing blocks (162) are installed on a basement (161), which in some embodiments can be extended to increase the number of sewing blocks (162). Thus, a combination of a sewing block (162) with its basement (161) and driving motor (179) is one of the possible options for a second module of the modular system.

After the material forming area, the base material (85) with the rovings bonded to it comes out of the machine through a system of rollers (165) and is spooled onto a spool (164).

All driving mechanisms of the machine, including the sewing blocks (162) and the base material feeder, are driven by motors (e.g. electric motors or hydraulic motors) and mechanically or electronically synchronized. Thus, several fiber rovings are sequentially placed on base material (85) according to a predefined filling pattern in additive-layer manner. The whole process is controlled by a computer program and can be fulfilled either completely autonomously or with additional control of a human operator. The commands which the machine should perform to form a build material can be stored in a computer file in the form of e.g. standard G-code which is typically used in AM machines.

In some embodiments, the stitching yarns (84) are replaced with selective injection of glue or uncured liquid resin onto a fiber roving to glue the roving to the base material (85). To this end, at least some of the one or more sewing blocks (162) are replaced with one or more injectors (82) and one or more curing devices for selective injection of an adhesive material (e.g. a glue or a resin) and subsequent curing of the adhesive to fix the one or more separate fiber rovings onto the base material (85) according to a filling pattern. In this case, the process should be stopped for a while to provide hardening of the adhesive. To initiate or fasten hardening of adhesive, an appropriate electromagnetic radiation can be applied (for example, laser). In some embodiments, the one or more curing devices are selected from electromagnetic radiation (EMR) emitters (81), such as emitters of visible light, ultraviolet light, infrared radiation and/or gamma radiation, and/or sources of a mechanical stimuli, such as ultrasound. Thus, a second module with such equipment can be installed instead of a normal sewing block.

Hybrid fiber rovings comprising thermoplastic yarns can also be applied. In this case, laser can be used to selectively sinter the hybrid roving and thereby fix it on the base material (85) instead of stitching or gluing. The laser is installed in a further variation of a second module.

In some embodiments, the machine can be equipped with one or more third modules comprising a 3D-printing head (152) (FDM, SLA, PolyJet, SLS, free-form and others) to add additional elements, for example fixtures, into the structure of the build material. In addition, stamps, presses and similar equipment can be used to add standardized $3^{rd}$-party's hardware (for example, aforementioned fixtures) into the structure of the build material.

In some embodiments, the machine may be equipped with one or more third modules comprising cutting devices for different purposes. For example, the ready build material can be cut into finite pieces to be used as an end-product device, or to be packed into cartridges, cassettes or the like. Different type of cutting devices can be used directly in the process of manufacturing the build material for selective cutting of some elements of the build material. In a similar manner, for example, hooks on a Velcro strap are cut from initially closed loops.

In some embodiments, the machine can be equipped with a fourth module comprising a bath (167) with resin to pre-impregnate the resulting build material in a liquid pre-polymer.

The ends of a finite-length piece of the base material (85) can be connected in a closed loop. Thus, the process can be cyclically repeated several times to stitch more fiber rovings on the same base material (85) using a smaller number of sewing blocks (162).

Figure 36A:
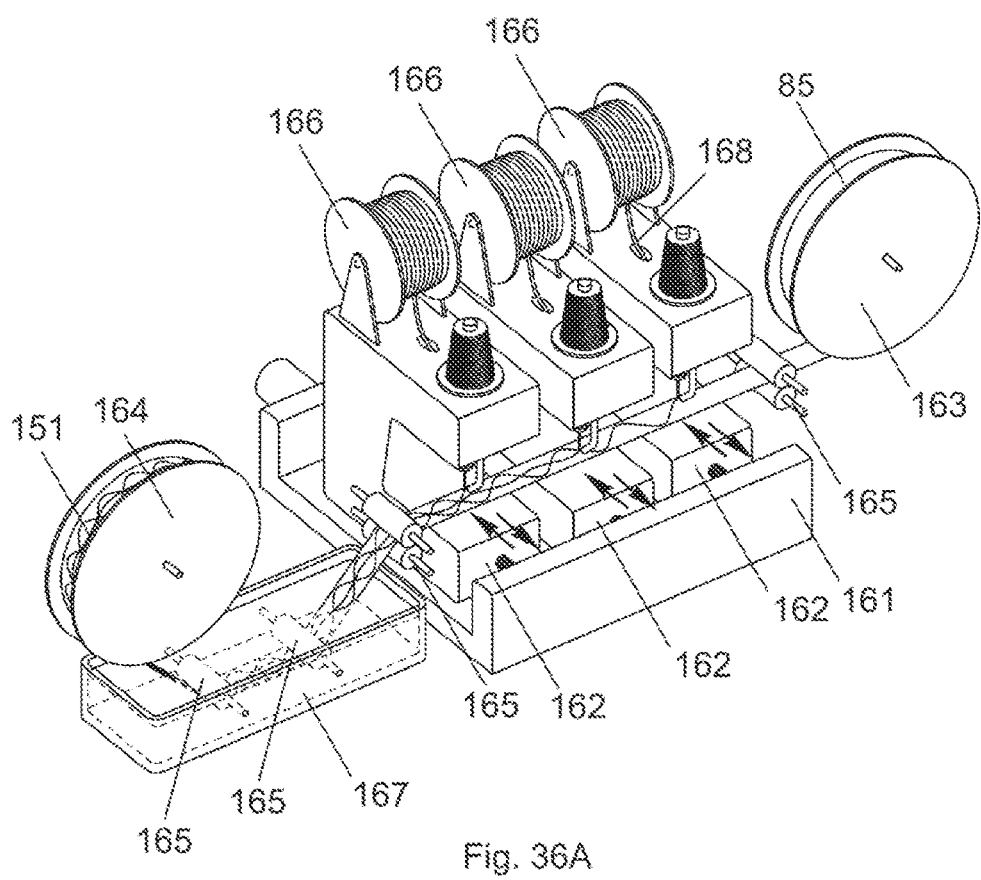
FIG. 36A illustrates embodiments, wherein the machine produces a continuous thermosetting prepreg build material (151).
Figure 36B:
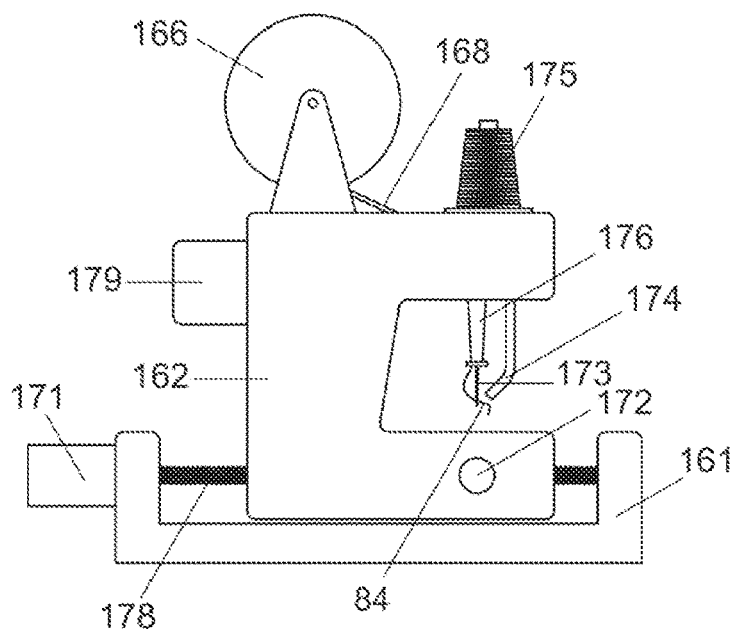
FIG. 36B illustrates an example of a sewing block (162) comprised in a machine.
Figure 36C:
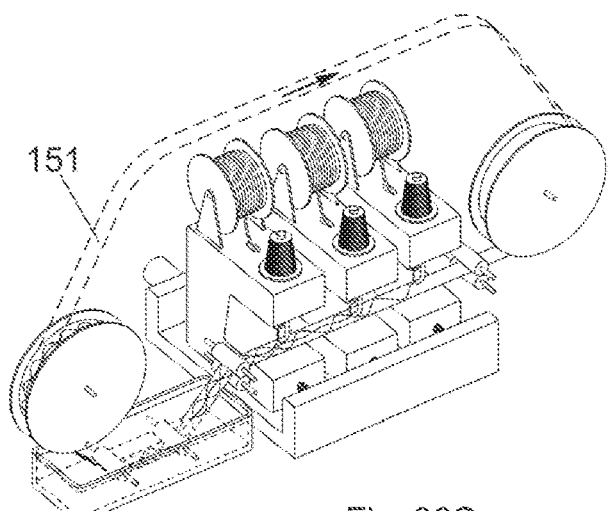
FIG. 36C shows an example of a machine in which a build material (151) is connected into a closed loop and repetitively fed into the machine.
Figure 36D:
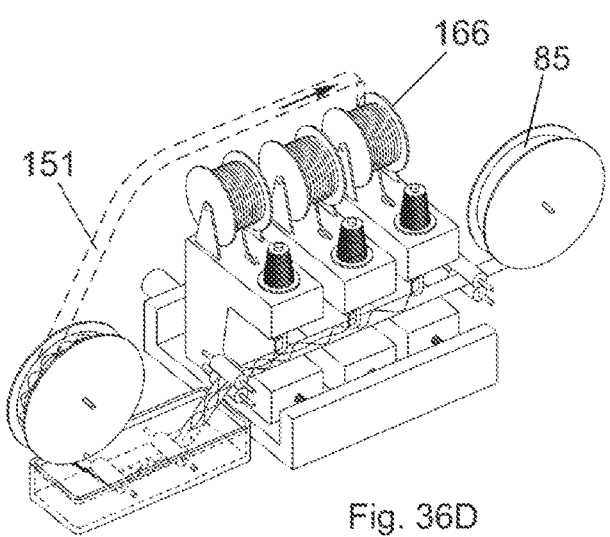
FIG. 36D shows an example of a machine in which the build material is spooled on a spool for fiber rovings (166) and used instead of a fiber roving to be further stitched on a base material (85).

Continuous base material (85) prepared with the machine can be again used by the machine instead of plain fiber rovings. For instance, the base material (85), after passing the working area, can be spooled on one of the fiber roving spools (166) and fed instead of a plain fiber roving (FIG. 36D). Thus, a recursive multi-level hierarchical structure of the final build material can be achieved.

The machine can be equipped with a fifth, or a device-production, module, and thus become a full-cycle machine. The device-production module represents a 3D-printer, hot press, vacuum molding machine etc., which takes the build material from the main machine and fabricates end-product medical devices on the fly according to the principle described above. In the case of 3D-printing module, it can also be combined with a morphing printing bed. In some embodiments, the morphing printing bed is configured to change its own shape to reduce the amount of material wasted during manufacturing of the end-product device.

Also provided is use of the above-described machine for the manufacture of the continuous build material of the invention.

NUMBERED EMBODIMENTS

Some embodiments of the invention can be numbered as follows:

1. A continuous fiber-reinforced build material, comprising at least one continuous multifilament fiber roving comprising at least one braided segment.
2. The continuous fiber-reinforced build material according to embodiment 1, wherein the braided segment has a non-uniformly braided structure.
3. The continuous fiber-reinforced build material according to embodiment 1 or 2, wherein the braided segment comprises at least two nested levels of a braided structure.
4. The continuous fiber-reinforced build material according to any one of embodiments 1-3, comprising at least two continuous multifilament fiber rovings each comprising at least one braided segment.
5. The continuous fiber-reinforced build material according to embodiment 4, wherein the at least two continuous multifilament fiber rovings are bonded together at least partly by weaving, by knitting, by braiding, by stitching, by sintering, via external fixtures, via an adhesive material or by using any combination thereof.
6. The continuous fiber-reinforced build material according to embodiment 5, wherein at least the braided segments of the at least two continuous multifilament fiber rovings are bonded together at least partly by weaving, by knitting, by braiding, by stitching, by sintering, via external fixtures, via an adhesive material or by using any combination thereof.
7. The continuous fiber-reinforced build material according to any one of embodiments 4-6, wherein the at least two continuous multifilament rovings each having at least one braided segment are bonded together at intervals through joining points.

8. The continuous fiber-reinforced build material according to embodiment 7, wherein the build material has an unfolding structure between adjacent joining points.

9. The continuous fiber-reinforced build material according to any one of embodiments 1-3, wherein the at least one the continuous multifilament roving has at least two segments whose cross-sectional profiles allow stacking of the segments in different planes or layers, interlocking of the segments in different planes or layers or a combination thereof.

10. The continuous fiber-reinforced build material according to any one of embodiments 4-8, wherein the at least two continuous multifilament rovings have cross-sectional profiles that allow stacking of the at least two continuous multifilament rovings in different planes or layers, interlocking of the at least two continuous multifilament rovings in different planes or layers or a combination thereof.

11. The continuous fiber-reinforced build material according to any one of embodiments 1-10, comprising one or more elements selected from the group consisting of short fibers, spikes, thorns, hooks or fixtures.

12. The continuous fiber-reinforced build material according to embodiment 11, wherein the one or more elements are fixtures selected from the group consisting of wires, nuts, threaded or plain rods, hubs, bushings and grommets.

13. The continuous fiber-reinforced build material according to embodiment 11 or 12, wherein the one or more elements are attached to build material by insertion, by weaving, by knitting, by braiding, by stitching, via external fixtures, via an adhesive material or by using any combination thereof, or wherein at least one fixture is formed from a segment of the at least one continuous multifilament fiber roving comprising at least one braided segment.

14. The continuous fiber-reinforced build material according to any one of embodiments 11-13, wherein the elements protrude from the main axis of the build material.

15. The continuous fiber-reinforced build material according to any one of embodiments 1-14, wherein at least one of the fibers of the multifilament fiber roving forms one or more loops creating one or more apertures (23) through the build material.

16. The continuous fiber-reinforced build material according to any one of embodiments 1-15, wherein the braided segment forms one or more loops creating one or more apertures (23) through the build material.

17. The continuous fiber-reinforced build material according to embodiment 15, wherein the one or more loops are cut to create hooks for a hook-and-loop structure.

18. The continuous fiber-reinforced build material according to embodiment 15 or 16, wherein the one or more apertures (23) are screw holes.

19. The continuous fiber-reinforced build material according to any one of embodiments 1-18, comprising a base material.

20. The continuous fiber-reinforced build material according to embodiment 19, wherein the at least one continuous multifilament fiber roving comprising at least one braided segment is bonded to the base material by stitching, gluing, sintering, mechanical or chemical bonding.

21. The continuous fiber-reinforced build material according to any one of embodiments 1-20, comprising matrix material.

22. The continuous fiber-reinforced build material according to embodiment 21, wherein the build material is pre-impregnated with a liquid prepolymer to provide the matrix material.

23. The continuous fiber-reinforced build material according to embodiment 21, wherein the multifilament fiber roving comprises fibers of thermoplastic material to provide the matrix material.

24. The continuous fiber-reinforced build material according to embodiment 21, wherein the build material is encapsulated within a hardened but flexible thermoplastic shell comprising the matrix material.

25. The continuous fiber-reinforced build material according to any one of embodiments 1-20, provided in a dry state without matrix material.

26. The continuous fiber-reinforced build material according to any one of embodiments 1-25 as an end-product device, such as a medical device.

27. Use of the continuous fiber-reinforced build material according to any one of embodiments 1-26 for the manufacture of an end-product device, such as a medical device, by a technique selected from the group consisting of 3D printing techniques, 2D textile techniques, 3D textile techniques and combinations thereof.

28. The use according to embodiment 27, wherein the 3D printing technique is selected from the group consisting of modified FDM, SLA, PolyJet, SLS, free-form techniques and combinations thereof.

29. The use according to embodiment 27, wherein the 2D textile technique is selected from the group consisting of tailored fiber placement (TFP), embroidery and combinations thereof with subsequent
   a) solidification of the matrix material comprised in the continuous fiber-reinforced build material according to any one of embodiments 21-24; or
   b) addition of matrix material to the continuous fiber-reinforced build material according to embodiment 25 and solidification of the matrix material.

30. The use according to embodiment 27, wherein the 3D textile technique is selected from the group consisting of braiding, weaving, knitting and combinations thereof with subsequent
   a) solidification of the matrix material comprised in the continuous fiber-reinforced build material according to any one of embodiments 21-24; or
   b) addition of matrix material to the continuous fiber-reinforced build material according to embodiment 25 and solidification of the matrix material.

31. The use according to embodiment 29 or 30, wherein the solidification is carried out in a mold, in a soft removable shell, in a soft permanent shell, on air or in a combination thereof.

32. Use of the continuous fiber-reinforced build material according to any one of embodiments 1-26 in medical industry, construction industry, marine industry, airspace industry, automotive industry, human-powered vehicles, sport equipment, leisure equipment or and recreational equipment.

33. Use of a piece of the continuous fiber-reinforced build material according to any one of embodiments 21-24 as a medical device after solidification of the matrix material in situ or in a mold.

34. The use according to embodiment 33, wherein the piece of the continuous fiber-reinforced build material is applied directly along a recipient's bone in situ (e.g. by printing) and then solidified on its place along the bone; or the piece of the continuous fiber-reinforced build material is fitted to a recipient's bone in situ to form a fitted shape, the piece having the fitted shape is solidified outside the recipients body and the solidified piece having the fitted shape is placed back along the recipient's bone and fixed on its place.

35. A fiber-reinforced medical device comprising the continuous fiber-reinforced build material comprising at least one continuous multifilament fiber roving comprising at least one braided segment according to any one of embodiments 1-26 in a spatial arrangement comprising at least three different segments, wherein a first segment is placed in the direction of bending of the device, a second segment is placed in the direction of torsion of the device and a third segment is placed along at least one of the borders of the device.

36. The device according to embodiment 35, comprising one or more apertures (23).

37. The device according to embodiment 35 or 36, wherein at least some of the apertures (23) are bypassed by the third segment of the build material.

38. The device according to embodiment 35 or 36, wherein said one or more apertures (23) are apertures (23) for external fixtures.

39. The device according to embodiment 35 or 36, wherein the distance of the middle of the third segment bypassing the aperture (23) from the center of said aperture (23) is shorter than the radius of a head of a fixture to be used for fixing the device to its place.

40. The device according to any one of embodiments 35 to 39, wherein build material comprises a hybrid multifilament fiber roving comprising fibers of different materials.

41. The device according to any one of embodiments 35 to 40, prepared by embroidery, medical embroidery, technical embroidery, tailored fiber placement, three-dimensional printing, additive-layer printing, free-form printing of continuous fiber composite materials, three-dimensional weaving, three-dimensional knitting or a combination thereof.

42. The device according to any one of embodiments 25 to 41, impregnated in a matrix phase to form a composite device.

43. The continuous fiber-reinforced build material according to embodiment 21 or the device according to embodiment 42, wherein the matrix is selected from the group consisting of pure polymers, blends of polymers, copolymers, interpenetrating polymer networks, semi-interpenetrating polymer networks, metals, metal alloys, ceramic materials.

44. The continuous fiber-reinforced build material according to any one of embodiments 1-25 or the device according to any one of embodiments 35-44, wherein the multifilament fiber roving comprises fibers made from glass fibers, such as fibers of bioactive glass, S-glass, R-glass, D-glass, C-glass, E-glass or A-glass, carbon fibers, quartz fibers, ceramic fibers, glass-ceramic fibers, metal fibers, synthetic or semi-synthetic polymer fibers, such as those made of polyamide, polyimide, and natural polymer fibers such as silk fibers, and metals or any combinations thereof.

45. The continuous fiber-reinforced build material according to any one of embodiments 1-25 or the device according to any one of embodiments 35-42, comprising one or more voids.

46. The continuous fiber-reinforced build material or the device according embodiment 45, wherein at least one of said one or more voids comprises autograft, allograft, xenograft, synthetic bone substitute, scaffold for tissue regeneration, active agents and/or musculoskeletal grafts.

47. The continuous fiber-reinforced build material or the device according to embodiment 46, wherein said active agent is selected from the group consisting of antibiotics; immunosuppressants; immunostimulators; anti-inflammatory agents; proteins such as osteocalcin, osteoglycin and growth factors such as bone morphogenic proteins (e.g. BMP-2, -4, -6, -7 and -9), fibroblast growth factors (FGFs), vascular endothelial growth factors (VEGFs), platelet derived growth factors (PDGFs), and transforming growth factors, such as TGF-β; antimicrobial agents such as antifungal agents, and antiviral agents; and nanoparticles such as silver.

48. The device according to any one of embodiments 35-49, wherein the device comprises one or more fixtures such as wires, nuts, threaded or plain rods, hubs, bushings and grommets, made of metals, ceramics, polymers or composites.

49. The device according to any one of embodiments 35-48, wherein the device is a bone plate, a bone screw, an anchor, an intramedullary pin, an orthopaedic wire, a dental disk, a dental implant, a periodontal splint, an orthodontic retainer, a provisional bridge, a dental post, a tooth stump, a cranial implant, a spinal cage, an osteotomy wedge, a device for maxillo-facial reconstruction, a patch or a tape.

50. A modular machine for manufacturing of the continuous fiber-reinforced build material according to any one of embodiments 1-25, comprising one or more parallel sets each comprising:
  a first module comprising a base material feeder for feeding continuous base material for the continuous fiber-reinforced build material into a material forming area and removing of a ready build material from the material forming area; and
  one or more second modules comprised in the material forming area, each comprising a device for placing one or more fiber rovings on the base material according to a filling pattern, wherein the build material is being assembled from the base material and the one or more fiber rovings; and
  optionally, one or more third modules comprised in the material forming area, each comprising a device for installation of additional elements, or a cutting device for cutting of the build material or the fiber rovings comprised in the build material; and
  optionally, one or more fourth modules comprised in the material forming area, each comprising a bath for pre-impregnation of the build material in a liquid prepolymer; and
  optionally, a fifth module comprising a device for manufacturing of an end-product device.

51. The machine according to embodiment 50, wherein the continuous base material is in a form of a continuous band of thin and flexible sheet material, such as woven fabric, non-woven fabric, textile mesh, paper or polymer film.

52. The machine according to embodiment 50 or 51, wherein the one or more second modules are sewing blocks comprising:
  a needle;
  a shuttle mechanism;
  a stitching yarn feeder; and
  a fiber roving feeder.

53. The machine according to any one of embodiments 50-52, wherein the one or more second modules and the base material feeder comprised in the first module are driven by a motor and are synchronized mechanically or electronically to stitch one or more separate fiber rovings which are fed into the material forming area onto the base material according to the filling pattern.

54. The machine according to embodiment 53, wherein the motor is an electric motor or a hydraulic motor.

55. The machine according to embodiment 52, wherein at least some of the one or more second modules are modules comprising an injector and a curing device for selective injection of an adhesive material and subsequent curing of the adhesive material to fix the one or more separate fiber rovings onto the base material according to a filling pattern.

56. The machine according to embodiment 55, wherein the one or more curing devices are electromagnetic radiation (EMR) emitters, such as emitters of visible light, ultraviolet light, infrared radiation and/or gamma radiation, and/or sources of a mechanical stimuli, such as ultrasound.

57. The machine according to embodiment 55, wherein the adhesive material is a resin or a glue.

58. The machine according to embodiment 55 or 56, wherein the one or more curing devices are configured to sinter thermoplastic yarns comprising hybrid build material.

59. The machine according to any one of embodiments 50-58, further comprising one or more third modules comprising a cutting device.

60. The machine according to embodiment 59, wherein the one or more cutting devices are configured to cut the manufactured build material into pieces of finite length, or to cut loops in the build material in accordance with embodiment 17 during the manufacturing process.

61. The machine according to any one of embodiments 50-62, further comprising one or more third modules comprising a 3D printing head.

62. The machine according to embodiment 61, wherein the one or more 3D printing heads are configured to add additional elements into the build material.

63. The machine according to embodiment 62, wherein the additional elements are fixtures.

64. The machine according to any one of embodiments 50-63, equipped with a fourth module comprising a bath for impregnation of the produced build material in a liquid prepolymer.

65. The machine according to any one of embodiments 50-64, wherein a finite piece of the continuous base material is connected into a closed loop and passed through the material forming area more than once to stitch a number of fiber rovings higher than the number of the second modules of embodiments 50-58 in the machine.

66. The machine according to any one of embodiments 50-65, further comprising a fifth module configured to use the build material manufactured by the machine to produce an end-product device.

67. The machine according to embodiment 66, wherein the module is selected from the group consisting of a 3D printer, a hot press and a molding machine.

68. The machine according to embodiment 66 or 67, wherein the module comprises a morphing printing bed.

69. The machine according to embodiment 68, wherein the morphing printing bed is configured to change its own shape to reduce the amount of material wasted during manufacturing of the end-product device.

70. The machine according to any one of embodiments 50-69, wherein the end-product device is the medical device according to any one of embodiments 35-49.

LIST OF REFERENCE SIGNS 11 primary loading in bending
12 secondary loading in torsion
21 an outer border
22 an inner border
23 an aperture
31 a primary reinforcing segment
32 a segment with combined primary reinforcing and contouring functions
33 a secondary reinforcing segment
34 a segment with combined secondary reinforcing and contouring functions
40 an insert
41 a musculoskeletal graft
50 a composite anchor
51 a bandage
60 a disk
61 a dental tape with an integrated stump structure
71 a braided segment
72 a straight segment
81 an EMR emitter
82 an injector of adhesive material
83 adhesive material
84 a stitching yarn
85 a base material
91 glued joining points
92 knitted joining points
101 a threaded hub
102 a threaded rod
111 a loop
112 a cut loop
121 a thermoplastic polymer shell of an embedded build material
131 a mold
132 a thermoplastic prepreg preform of an end-product device
133 a lid of a mold
134 a dry preform
141 a shell for transfer molding
142 a resin inlet
143 a resin outlet
145 cutting lines
151 a continuous build material
152 a 3D-printing head for in situ printing
153 a thermosetting prepreg preform of an end-product medical device
161 abasement of a machine
162 a sewing block
163 a spool for a base material
164 a spool for a ready build material
165 rollers
166 a spool for fiber rovings
167 a bath for liquid prepolymer
168 a fiber roving
171 A motor providing transversal move of a sewing block
172 A shuttle mechanism
173 A needle
174 A fiber roving feeder
175 A spool for stitching yarn
176 A needle guide comprising a stitching yarn feeder
178 A helical gear providing transversal move of a sewing block
179 A motor of a sewing block

The invention claimed is:

1. A continuous fiber-reinforced build material for a medical device, comprising at least two continuous multifilament fiber rovings each comprising at least one braided segment having a non-uniformly braided structure, wherein the at least two continuous multifilament rovings are bonded together at intervals through joining points and wherein the build material has an unfolding structure between adjacent joining points creating an umbrella or fishnet structure, and wherein the medical device is for management of musculoskeletal or dental disorders.

2. The continuous fiber-reinforced build material according to claim 1, wherein the at least one braided segment of each of the at least two continuous multifilament fiber rovings comprise at least two nested levels of a braided structure.

3. The continuous fiber-reinforced build material according to claim 1, wherein the at least two continuous multifilament fiber rovings are bonded together at least partly by weaving, by knitting, by braiding, by stitching, by sintering, via external fixtures, via an adhesive material or by using any combination thereof.

4. The continuous fiber-reinforced build material according to claim 3, wherein at least the braided segments of the at least two continuous multifilament fiber rovings are bonded together at least partly by weaving, by knitting, by braiding, by stitching, by sintering, via external fixtures, via an adhesive material or by using any combination thereof.

5. The continuous fiber-reinforced build material according to claim 1, comprising matrix material.

6. The continuous fiber-reinforced build material according to claim 5, wherein the build material is pre-impregnated with a liquid prepolymer to provide the matrix material.

7. The continuous fiber-reinforced build material according to claim 5, wherein at least one of the at least two continuous multifilament fiber rovings comprises fibers of thermoplastic material to provide the matrix material.

8. The continuous fiber-reinforced build material according to claim 5, wherein the matrix material is selected from the group consisting of pure polymers, blends of polymers, copolymers, interpenetrating polymer networks, semi-interpenetrating polymer networks, metals, metal alloys, ceramic materials.

9. The continuous fiber-reinforced build material according to claim 1, provided in a dry state without matrix material.

10. The continuous fiber-reinforced build material according to claim 1, wherein the continuous fiber-reinforced build material is an end-product device.

11. The continuous fiber-reinforced build material according to claim 10, wherein the end-product device is a bone plate, a bone screw, an anchor, an intramedullary pin, an orthopaedic wire, a dental disk, a dental implant, a periodontal splint, an orthodontic retainer, a provisional bridge, a dental post, a tooth stump, a cranial implant, a spinal cage, an osteotomy wedge, a device for maxillo-facial reconstruction, a patch or a tape.

12. The continuous fiber-reinforced build material according to claim 1, wherein at least one of the at least two multifilament fiber rovings comprises fibers made from glass fibers, carbon fibers, quartz fibers, ceramic fibers, glass-ceramic fibers, metal fibers, synthetic polymer fibers, or semi-synthetic polymer fibers.

13. The continuous fiber-reinforced build material according to claim 12, wherein the glass fibers are selected from the group consisting of: fibers of bioactive glass, fibers of S-glass, fibers of R-glass, fibers of D-glass, fibers of C-glass, fibers of E-glass, and fibers of A-glass.

14. The continuous fiber-reinforced build material according to claim 12, wherein the fibers made from synthetic polymer fibers or semi-synthetic polymer fibers include fibers made from polyamide or fibers made from polyimide.

15. The continuous fiber-reinforced build material according to claim 1, comprising one or more voids.

16. The continuous fiber-reinforced build material according claim 15, wherein at least one of said one or more voids comprises autograft, allograft, xenograft, synthetic bone substitute, scaffold for tissue regeneration, active agents and/or musculoskeletal grafts.

17. The continuous fiber-reinforced build material according to claim 16, wherein the active agents are selected from the group consisting of: antibiotics; immunosuppressants; immunostimulators; anti-inflammatory agents; osteocalcin; osteoglycin; growth factors; antimicrobial agents; and nanoparticles.

18. The continuous fiber-reinforced build material according to claim 17, wherein the growth factors include bone morphogenic proteins, fibroblast growth factors (FGFs), vascular endothelial growth factors (VEGFs), platelet derived growth factors (PDGFs), and transforming growth factors.

19. The continuous fiber-reinforced build material according to claim 18, wherein the bone morphogenic proteins include bone morphogenic protein 2 (BMP-2), bone morphogenic protein 4 (BMP-4), bone morphogenic protein 6 (BMP-6), bone morphogenic protein 7 (BMP-7) and bone morphogenic protein 9 (BMP-9).

20. A continuous fiber-reinforced build material for a medical device, comprising at least two continuous multifilament fiber rovings each comprising at least one braided segment, wherein the at least two continuous multifilament rovings are bonded together at intervals through joining points and wherein the build material has an unfolding structure between adjacent joining points creating an umbrella or fishnet structure, wherein build material comprises a hybrid multifilament fiber roving comprising fibers of different materials, and wherein the medical device is for management of musculoskeletal or dental disorders.

* * * * *